(12) United States Patent
Nobbee et al.

(10) Patent No.: US 12,312,820 B2
(45) Date of Patent: May 27, 2025

(54) COMPOSITE STRUCTURAL BOARD AND WALL SYSTEMS CONTAINING SAME

(71) Applicant: DUPONT SAFETY & CONSTRUCTION, INC., Wilmiington, DE (US)

(72) Inventors: Wazir Nobbee, Chesterfield, VA (US); Jesse C. Thrower, II, Midlothian, VA (US); James Dean Katsaros, Midlothian, VA (US); Stephane Costeux, Midland, MI (US); John Neill, Bristol (GB); William Brian Lieburn, Plain City, OH (US); Bryn Thomas, Bristol (GB)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 47 days.

(21) Appl. No.: 18/486,507

(22) Filed: Oct. 13, 2023

(65) Prior Publication Data
US 2024/0035288 A1 Feb. 1, 2024

Related U.S. Application Data

(62) Division of application No. 16/993,730, filed on Aug. 14, 2020, now Pat. No. 11,821,220.
(Continued)

(51) Int. Cl.
*B32B 7/12* (2006.01)
*E04B 1/68* (2006.01)
(Continued)

(52) U.S. Cl.
CPC ............... *E04F 19/04* (2013.01); *B32B 7/12* (2013.01); *E04B 1/68* (2013.01); *E04B 2/02* (2013.01);
(Continued)

(58) Field of Classification Search
CPC ... B32B 7/12; B32B 2307/7265; B32B 27/32; B32B 2419/00; B32B 2607/00; E04B 1/625; E04B 1/665; E04D 3/358
See application file for complete search history.

(56) References Cited

U.S. PATENT DOCUMENTS

| 4,586,308 A | 5/1986 | Jennings |
| 5,001,879 A * | 3/1991 | Paliwoda ................ E04C 2/288 52/525 |

(Continued)

FOREIGN PATENT DOCUMENTS

| GB | 2539493 A | 12/2016 |
| WO | 99/29978 A1 | 6/1999 |

OTHER PUBLICATIONS

PCT International Search Report for Application No. PCT/US2020/051495; Violandi Vratsanou, Authorized Officer; ISA/EPO; Jan. 14, 2021.

*Primary Examiner* — Christine T Cajilig
*Assistant Examiner* — Daniel J Kenny

(57) ABSTRACT

A composite structural board having a structural board and a water-resistant barrier (WRB) sheet, and a wall system comprising same, wherein a face of the structural board is discontinuously attached to the inner face of the WRB sheet solely by a first adhesive, the WRB sheet fully covering the face of the structural board; wherein the unattached areas between the face of the structural board and the inner face of the WRB sheet define paths by which a liquid can move between the face of the structural board and the inner face of the WRB sheet; in some instances the WRB sheet material extends beyond at least one edge of the structural board forming a WRB sheet flap.

14 Claims, 13 Drawing Sheets

Related U.S. Application Data

(60) Provisional application No. 62/901,929, filed on Sep. 18, 2019.

(51) Int. Cl.
    *E04B 2/02* (2006.01)
    *E04F 19/02* (2006.01)
    *E04F 19/04* (2006.01)
    *F16J 15/02* (2006.01)
    *E04B 1/24* (2006.01)

(52) U.S. Cl.
    CPC .......... *E04F 19/022* (2013.01); *F16J 15/028* (2013.01); *B32B 2307/718* (2013.01); *B32B 2307/724* (2013.01); *B32B 2307/748* (2013.01); *B32B 2607/00* (2013.01); *E04B 2001/2451* (2013.01); *E04B 2002/0276* (2013.01)

(56) References Cited

U.S. PATENT DOCUMENTS

| | | | |
|---|---|---|---|
| 5,098,770 A | | 3/1992 | Paire |
| 5,236,757 A | * | 8/1993 | Probst ............... B27N 3/04 |
| | | | 428/920 |
| 6,355,333 B1 | | 3/2002 | Waggoner et al. |
| 6,901,712 B2 | | 6/2005 | Lionel |
| 7,607,271 B2 | * | 10/2009 | Griffin ............... E04D 3/355 |
| | | | 52/535 |
| 7,829,197 B2 | | 11/2010 | Chen et al. |
| 7,838,123 B2 | | 11/2010 | Chen et al. |
| 8,277,915 B2 | | 10/2012 | Couturier |
| 8,397,465 B2 | | 3/2013 | Hansbro et al. |
| 8,959,861 B1 | * | 2/2015 | Wambaugh ......... E04F 13/0898 |
| | | | 52/409 |
| 10,267,039 B2 | * | 4/2019 | Bergman ............ E04B 9/067 |
| 2008/0289279 A1 | | 11/2008 | Hannan et al. |
| 2009/0255201 A1 | | 10/2009 | Kraus, Jr. et al. |

* cited by examiner

COMPOSITE STRUCTURAL BOARD AND WALL SYSTEMS CONTAINING SAME

BACKGROUND OF THE INVENTION

Field of the Invention

This invention further pertains to a composite structural board comprising a structural board and a vapor-permeable water-resistant barrier (WRB) sheet that is useful in providing a sealed building envelope, and wall systems containing such composite structural boards. This invention also pertains to a method for covering and accessing mate lines during building construction.

Background

There is a need for improved wall sheathing assembly comprising a structural board and a vapor-permeable water-resistant barrier (WRB) sheet attached to the outer surface of that board that provides the potential for improved sealing of the building envelope.

Further, there is a need for a wall sheathing assembly that provides features for improved sealing of the butt joints between individual wall sheathing boards.

Likewise, there is a trend for multi-story buildings such as hotels, hospitals and apartments' to be assembled from modules prefabricated off-site. Some of these modules have an exterior wall. Industry practice is for an exterior wall to comprise wall sheathing often of wood such as plywood, oriented strand board (OSB) or particle board and a vapor-permeable water-resistant barrier (WRB) sheet attached to the outer surface of the sheathing.

The joint between the modules in a building frequently has a gap between the two exterior faces. This gap is called a mate line and it provides access between adjacent modules to allow service lines such as plumbing, electrical conduits, HVAC ducts to be installed or inspections carried out. The WRB sheet also covers the mate line. These mate lines are exposed and then closed several times while completing the installation of services and many staple holes and wrinkles in the WRB are realized from the numerous cycles of closing and opening the WRB flaps that are covering the mate lines. This results in deterioration in the integrity and performance of the WRB sheet at the mate line.

There is also a need therefore to provide a more effective solution to providing mate line access and closure without causing excessive deterioration in the WRB flap that covers the mate line.

BRIEF SUMMARY OF THE INVENTION

This invention pertains to a composite structural board comprising:
a) a structural board; and
b) a water-resistant barrier sheet having a basis weight 100 g/m² or less, a hydrostatic head of 55 cm or greater, a Gurley Hill porosity of 250 seconds or greater, and a moisture vapor transmission rate of at least 130 g/m2/24 hrs,
the water-resistant barrier sheet having an inner face and an outer face; and
wherein a face of the structural board is discontinuously attached to the inner face of the water-resistant barrier sheet solely by a first adhesive, the water-resistant barrier sheet fully covering the face of the structural board;
wherein the composite structural board has
i) attached areas between the face of the structural board and the inner face of the water-resistant barrier sheet, and
ii) unattached areas between the face of the structural board and the inner face of the water-resistant barrier sheet;
the unattached areas between the face of the structural board and the inner face of the water-resistant barrier sheet defining paths by which a liquid can move between the face of the structural board and the inner face of the water-resistant barrier sheet.

This invention further pertains to such a composite structural board wherein the face of the structural board has at least one edge, with the water-resistant barrier sheet extending a distance of five to thirty centimeters beyond the at least one edge of the structural board, the water-resistant barrier sheet material extending beyond the at least one edge of the structural board forming at least one water-resistant barrier sheet flap.

This invention further also pertains to a composite structural board having a water-resistant barrier sheet flap folded upon and demountably attached to the outer surface of the water-resistant barrier sheet, such that when a delamination force of 10 N/10 mm or less is imposed on the water-resistant barrier sheet flap it can be separated from the outer surface of the water-resistant barrier sheet.

This invention further relates to and includes a wall system comprising at least one composite structural board having any or all of the embodiments discussed herein.

This invention also pertains to a process for covering, protecting and providing access to mate lines during building construction comprising the steps of:
preparing a vertical and horizontal mate line closure flap,
carrying out a vertical and horizontal mate line access process,
carrying out a vertical and horizontal mate line closing process,
repeating the vertical and horizontal mate line access and closing processes as required, and
carrying out a vertical and horizontal mate line sealing process to complete the building weatherization.

BRIEF DESCRIPTION OF THE DRAWINGS

The figures are for illustration and are not necessarily drawn to scale.

DETAILED DESCRIPTION OF THE INVENTION

Composite Structural Board

This invention pertains to a composite structural board, suitable for providing a continuously sealed building envelope, comprising a structural board and a water-resistant barrier sheet. The water-resistant barrier sheet has a basis weight 100 g/m² or less, a hydrostatic head of 55 cm or greater, a Gurley Hill porosity of 250 seconds or greater, and a moisture vapor transmission rate, measured by the LYSSY method, of at least 130 g/m²/24 hrs. The water-resistant barrier sheet has an inner face and an outer face; and a face of the structural board is discontinuously attached to the inner face of the water-resistant barrier sheet solely by a first adhesive. The water-resistant barrier sheet fully covers the face of the structural board. Further, the composite structural board has attached areas between the face of the structural board and the inner face of the water-resistant barrier sheet, and unattached areas between the face of the structural board and the inner face of the water-resistant barrier sheet. The unattached areas between the face of the structural board and the inner face of the water-resistant barrier sheet define paths by which a liquid can move between the face of the structural board and the inner face of the water-resistant barrier sheet.

Such composite structure board assemblies are useful in wall systems.

In some embodiments, composite structure board assemblies further having one or more water-resistant barrier sheet flap(s) are useful to cover the contact points between structural boards in a wall. For example, covering the joints between structural boards, used to make an exterior wall, where the edges of the structural boards are butted together. These butt joints are not always uniform and can have gaps that allow for the infiltration of air into the wall. As used herein, the terms "butt joint", "abutment joint", "joint", and "junction" are used interchangeably for the in-plane joint between two board boards.

Figure 1:
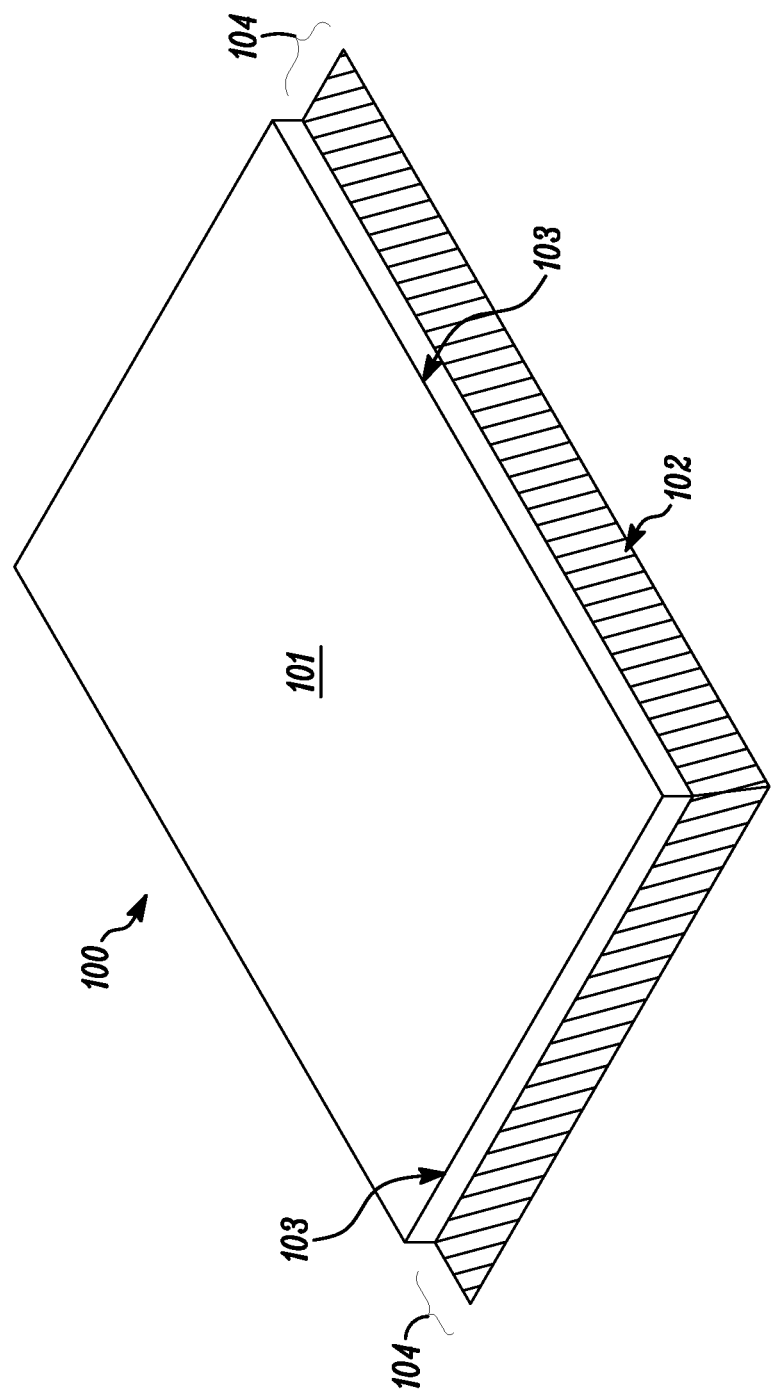
FIG. 1 is an illustration of the perspective view of a composite structural board comprising a structural board and a WRB sheet, illustrating the embodiment having WRB sheet flaps on two edges.
Figure 2:
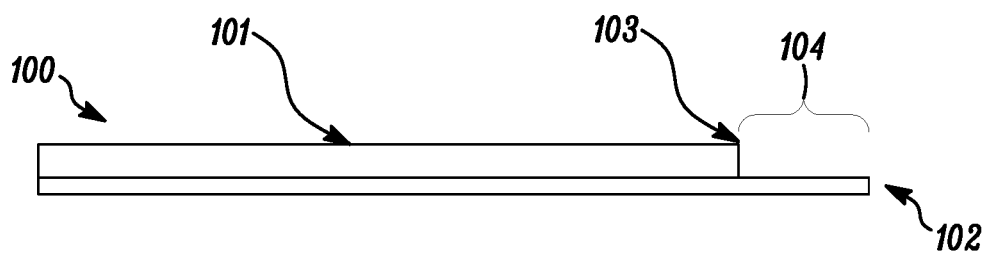
FIG. 2 is an illustration of a crossectional view of the composite structural board of FIG. 1.

FIGS. 1-2, illustrate one embodiment of a composite structural board 100 suitable for providing a continuously sealed building envelope, comprising a structural board 101 and a water-resistant barrier sheet 102; wherein the face of the structural board has at least one edge 103, with the water-resistant barrier sheet extending a distance 104 of five to thirty centimeters beyond the at least one edge of the structural board. The water-resistant barrier sheet material extending beyond the at least one edge of the structural board forms a water-resistant barrier sheet flap 105.

The WRB sheet 102 has an inner face and an outer face, with the inner face of the WRB sheet being in contact with a face of the structural board 101 in a face-to-face manner, fully covering the face of the structural board. The face of the structural board is further discontinuously attached to the inner face of the WRB sheet solely by a first adhesive. FIG. 1 illustrates the WRB sheet extending a distance 104 of five to thirty centimeters beyond the at least one edge 103 of the structural board, forming a WRB sheet flap 105. FIG. 1 specifically illustrates a composite structural board having a WRB sheet having a length and width that is larger than the length and width of the structural board, and further illustrates the specific embodiment wherein the WRB sheet is discontinuously attached to the structural board such that the WRB sheet extends beyond two of the edges of the structural board, creating exactly two WRB sheet flaps. As illustrated in FIG. 1, two of the edges of the WRB sheet are coextensive with two of the edges of the structural board, while the two other edges of the WRB are not.

The WRB sheet can be discontinuously attached solely by a first adhesive, to a face of the structural board 101 in a face-to-face manner, fully covering the face of the structural board, wherein any number of edges of the WRB sheet are coextensive with the edges of the structural board. For example, for a rectangular board, all four edges of the WRB sheet and all four edges of the structural board can be coextensive, which necessarily means no WRB sheet flaps are created. Therefore, in some embodiments, the WRB sheet flap 105 is an optional feature. Likewise, in another embodiment, if three edges of the WRB sheet and three edges of the structural board are coextensive, the composite structural board will have a single WRB sheet flap. In still another embodiment, if only one edge of the WRB sheet and one edge of the structural board are coextensive, three WRB sheet flaps are necessarily created.

The overall shape of the composite structural board, the WRB sheet, and structural board could be of any general shape (e.g., rectangular, triangular, round, etc.); although it is preferable that they all have the same general shape, with a rectangular shape (which is intended to include a square shape) being most preferred overall shape for general building construction.

The WRB sheet is discontinuously attached, solely by a first adhesive, to the structural board. By use of the phrase "solely by a first adhesive" it is meant that the sole fastener of the WRB sheet to the structural board is an adhesive or a mixture of adhesives. That is, the term "first adhesive" could be a single adhesive or a mixture of adhesives, if that was desirable; and as used herein it is understood that the word "adhesive" could be a single adhesive composition of a mixture of adhesive compositions.

In some embodiments, the first adhesive is a permanent adhesive. By "permanent adhesive", it is meant the adhesive provides a strong bond or adhesion between the faces of the WRB sheet and the structural board such that the two cannot be separated without either tearing or damaging the adhesive, the WRB sheet, or the structural board. Whether or not an adhesive is a permanent adhesive can be determined in a simple and practical manner. The procedure is to take a sample of the composite structural board and attempt to separate the WRB from the structural board at room temperature (~20° C.). The adhesive is considered a permanent adhesive if the WRB cannot be removed from the structural board, or if one or more of the adhesive, the WRB sheet, or the structural board tears or the surface is disrupted. Typically the adhesive will fail first, leaving pieces of the adhesive on both the WRB and the structural board.

Suitable permanent adhesives for discontinuously adhering the WRB to the structural board include such things as certain pressure sensitive hot melt adhesives and moisture cured silicone based adhesives. Acrylic and solvent based pressure sensitive adhesives can also provide strong adhesion. By "pressure sensitive adhesive" it is meant an adhesive that forms a bond by applying pressure.

In some other embodiments, the first adhesive is non-permanent adhesive. As defined herein, a "non-permanent adhesive" allows the WRB to be separated from the structural board by hand at room temperature (~20° C.) with little effort, and without substantial tearing or damaging of the adhesive, the WRB, or the structural board.

Composite structural boards wherein the WRB is discontinuously attached solely by a non-permanent adhesive to the structural board are very useful at the build site, allowing an edge of the WRB to be lifted off or separated from the surface of the structural board in a localized area. This is very useful when it is desirable to insert or tuck flashing material between the WRB and the structural board, such as around openings in a wall, e.g., a window or door opening. For example, in some cases after a wall containing the composite structural board is installed an opening is cut in the board for a window in the wall. By using a non-permanent adhesive, the interface between the WRB and the structural board at the opening cut can be separated and flashing material inserted between the WRB and the structural board to create a more water-tight seal for an opening such as a door/window or other penetration opening through the board. In some preferred embodiments, the non-permanent adhesive adheres more strongly to the WRB than the structural wall, and is retained on the WRB when it is separated from the structural wall. In some preferred embodiments the non-permanent adhesive retains its ability to adhere, and the WRB can be reapplied to the surface of the wall or to the flashing by manual pressure.

Suitable non-permanent adhesives for discontinuously adhering the WRB to the structural board include such things as certain hot melt pressure sensitive adhesives, polyurethane-based foam adhesives (e.g., Great Stuff Pro™ Adhesive), acrylic pressure sensitive adhesives, and polyolefin and EVA based adhesives.

In some embodiments, the invention pertains to the composite structural board further having the water-resistant barrier sheet flap folded upon and demountably attached to the outer surface of the water-resistant barrier sheet, such that when a delamination force in the range of 7.0 N/10 mm or less is imposed on the water-resistant barrier sheet flap it can be separated from the outer surface of the water-resistant barrier sheet. Preferably the delamination force ranges from 1.0 to 7.0 N/10 mm.

Figure 3:
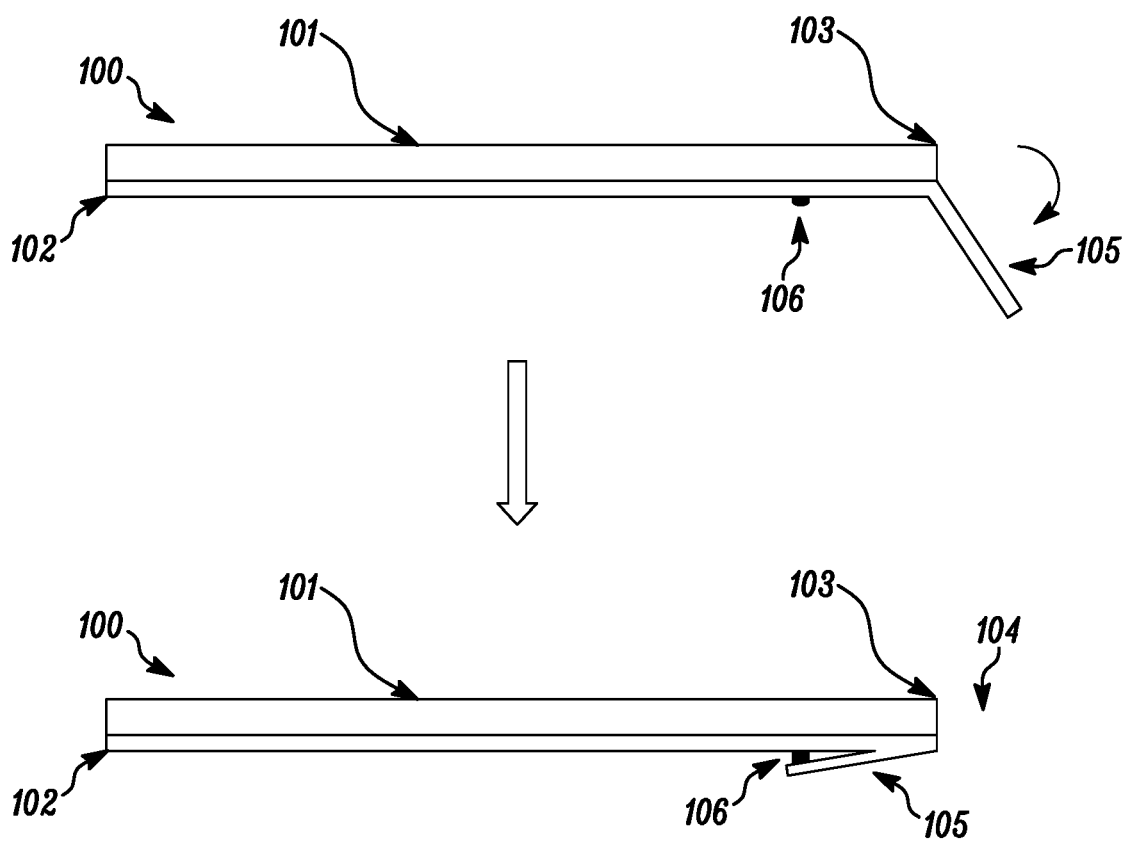
FIG. 3 is an illustration containing two crossectional views of the composite structural board, showing how the WRB sheet flap is folded upon itself and attached with an adhesive.

One embodiment of the water-resistant barrier sheet flap 105 demountably attached to the outer surface of the water-resistant barrier sheet is shown in FIG. 3. As shown, the water-resistant barrier sheet material extending beyond the edge of the structural board, which forms the water-resistant barrier sheet flap 105, is shown being folded back onto itself in the two illustrations, preferably with the fold being aligned parallel with the edge 103 of the structural board 101.

It can be appreciated that the water-resistant barrier sheet flap has an outer surface that is the same side of the water-resistant barrier sheet as the outer surface of the water-resistant barrier sheet. Likewise, the water-resistant barrier sheet flap has an inner surface that is the same side of the water-resistant barrier sheet as the inner surface of the water-resistant barrier sheet. Therefore, when the water-resistant barrier sheet flap is folded back onto itself, it is folded such that the outer surface of the water-resistant barrier sheet flap is in contact with the outer surface of the water-resistant barrier sheet.

As shown in FIG. 3, the water-resistant barrier sheet flap 105 is folded upon and demountably attached to the outer surface of the water-resistant barrier sheet with a second adhesive 106. For clarity, the sheet flap 105 is shown mostly but not totally folded against the outer surface of water-resistant barrier sheet 102; this representation is not intended to be limiting. Also, the sheet flap 105 is shown attached by a pressure-sensitive adhesive 106 represented as a dot of second adhesive. While a dot of second adhesive is shown in the figure, this is also not meant to be limiting to the amount or shape of the adhesive; for example, the second adhesive could be present as a line of adhesive. Further, the application point shown for the second adhesive is not to be considered limiting, as the point is selected as to best hold the flap for the intended use of the composite structural board.

Further, in FIG. 3 the second adhesive is shown initially on the outer surface of the water-resistant barrier sheet 102; it can be appreciated that the second adhesive could instead be on the outer surface of the water-resistant barrier sheet flap 105, which is the surface that is attached to the outer surface of the water-resistant barrier sheet 102. In addition, if thought useful, it is possible the second adhesive is applied to both the outer surface of the water-resistant barrier sheet flap 105 and the outer surface of the water-resistant barrier sheet 102.

Any combination is possible as long as the second adhesive is a "peelable" adhesive that adheres the outer surface of the water-resistant barrier sheet flap to the outer surface of the water-resistant barrier sheet such that when a delamination force of less than 7.0 N/10 mm or less is imposed on the flap it can be separated from the outer surface of the water-resistant barrier sheet without tearing the surface of either sheet. That is, the water-resistant barrier sheet flap can be demountably attached to the outer surface of the water-resistant barrier sheet via a suitable second adhesive that is a "peelable adhesive". As used herein, an adhesive is considered a peelable adhesive if it has cohesive or adhesive failure when a delamination force of 7 Newtons per 10 millimeters of width is placed on the adhesive at room temperature. Preferably the delamination force ranges from 1.0 to 7.0 N/10 mm.

This amount of peel force or delamination force can be determined in the laboratory by measuring the force required to pull apart, at room temperature (20° C.) in a suitable measuring device such as an Instron®, two layers of water-resistant barrier sheet that have been attached via adhesive. To measure the delamination force, the two layers are initially separated, and the individual layers are placed in the opposing jaws of a Chem-Instruments AR-1000 Adhesion/Release tester at a peel angle of 90° and the force needed to separate the two layers is measured at a speed of 304 mm/min. As such, the delamination force (or peel adhesion) is measured according to ASTM D 3330 Method F and reported in N/10 mm.

Peelable adhesives suitable for adhering the WRB sheet flap to the WRB sheet include such things as certain hot melt pressure sensitive adhesives, polyurethane-based foam adhesives (e.g., Great Stuff Pro™ Adhesive), acrylic pressure sensitive adhesives, and polyolefin and EVA based adhesives.

If desired, the WRB sheet flap that is folded upon and demountably attached to the outer surface of the WRB sheet using a peelable adhesive can further comprise additional adhesive on the opposing surface of the WRB sheet flap (exterior to the fold when the flap is folded) for reattaching the WRB sheet flap once it is unfolded. That is, the surface of the WRB sheet not attached to the WRB can be provided with a third adhesive that can be used to reattach the WRB sheet flap once it is unfolded. This third adhesive can be protected until it is needed by release paper. In this manner, a series of composite structural boards having WRB sheet flaps can be first be used to make a wall of the composite structural boards, and then the WRB sheet flaps can be unfolded and reattached to the WRB of the neighboring composite structural board, covering the butt joint between the composite structural boards. Additional sealing tape can then be applied to further seal all edges if desired. In fact, the use of the additional third adhesive provides a convenient method of positioning the unfolded flaps so that they can be easily further taped.

Additionally, if desired, the composite structural board can be provided with an elastomeric or other type of resilient gasket material positioned in the plane of the structural board, attached to and abutting the edge of the structural board, to provide additional sealing of the joint between one structural board an another when they are butted together to form a wall or panel.

One embodiment comprising at least one water-resistant barrier sheet flap is shown in FIG. 1. The face of the structural board has two opposing length edges and two opposing width edges, and the water-resistant barrier sheet extends a distance of five to thirty centimeters beyond both one length edge and one width edge of the face of the structural board, the water-resistant barrier sheet material extending beyond the one length edge and one width edge of the face of structural board forming a water-resistant barrier sheet flap along the length and width edge of the face of the structural board.

Structural boards useful in the composite structural board can include any boards suitable for use as exterior walls as wall sheathing. Such boards are often of wood such as plywood, oriented strand board (OSB) or particle board. In addition, other suitable boards include boards made from gypsum and magnesium oxide; boards that are themselves composite materials made from such things as wood fiber, continuous insulation, Thermoply™, glass fiber, and fire retardant treated wood; and boards made from metal, lightweight concrete, mass timber, and structural glass.

Water-resistant barrier (WRB) sheets useful in the composite structural board are generally any sheet material that does not allow or restricts movement of fluid through the sheet but does allow some movement through the sheet of vapor, particularly water vapor. In some embodiments, the WRB sheet is polymeric. Preferred polymeric sheets are polyethylene (PE) or polypropylene (PP). A suitable polyethylene sheet is a nonwoven web of flash-spun plexifilamentary high-density PE (HDPE) fibers available from DuPont, Wilmington, DE under the tradename TYVEK® Homewrap™. A suitable polypropylene substrate is available under the tradename TYPAR® Building Wraps.

Preferred WRB sheets meet the requirements of building codes, such as ASTM E2556, Standard Specification for a WRB. This code requires a dry tensile strength (both MD/CD), per ASTM D828 of at least 20 lb/in, and a water resistance, per AATCC 127 (Held at 55 cm) of no leakage in 5 hours. In some embodiments, the water-resistant barrier sheet has a basis weight of 100 $g/m^2$ or less, a hydrostatic head of 55 cm or greater, a Gurley Hill porosity of 250 seconds or greater, and a moisture vapor transmission rate of 130 $g/m^2/24$ hrs or greater.

In some other embodiments, the WRB sheet preferably has a moisture vapor transmission rate of at least 370 $g/m^2/24$ hours, is substantially liquid impermeable, having preferably a hydrostatic head of at least 180 cm; and is substantially air impermeable, having preferably a Gurley Hill porosity of 300 seconds or greater.

In some embodiments the WRB sheet has a basis weight range of from 50 to 100 $g/m^2$. It is believed that a basis weight below about 50 $g/m^2$ is likely too weak to be used in construction, and a basis weight of greater than 100 $g/m^2$ is undesirable as the additional weight does not provide any appreciable mechanical benefit.

In some embodiments the WRB sheet has a hydrostatic head of greater than 55 cm. In some embodiments the WRB can range from 55 to 1500 cm of water. It is believed a WRB sheet having a hydrostatic head of below 55 cm is too porous to liquids, and a WRB sheet having a hydrostatic head above 1500 cm generally requires additional sheet weight which may not be needed. In some embodiments, the WRB sheet has a hydrostatic head ranging from 180 to 1000 cm of water, with a hydrostatic head ranging from 200 to 500 cm of water being especially preferred.

In some embodiments the WRB sheet has a Gurley Hill porosity ranging from 250 to 6000 seconds. It is believed a WRB sheet having a Gurley Hill porosity of below 250 seconds is too porous to air, and a WRB sheet having a Gurley Hill porosity above 6000 seconds generally requires additional sheet weight which is not needed. In some embodiments, the WRB sheet has a Gurley Hill porosity ranging from 250 to 6000 seconds, with a Gurley Hill porosity ranging from 300 to 5000 seconds being especially preferred.

In some embodiments the WRB sheet has a "wet cup" LYSSY moisture vapor transmission rate ranging from 35 to 2000 $g/m^2/24$ hrs. It is believed a moisture vapor transmission rate of less than 35 $g/m^2/24$ hours will cause excessive liquid water to form on the surface of the WRB, while a moisture vapor transmission rate of greater than 2000 $g/m^2/24$ hours is adequate in even the most humid of circumstances. In some embodiments, a moisture vapor transmission rate of greater than 130 $g/m^2/24$ hours is desired, and in some other embodiments a moisture vapor transmission rate of greater than 250 $g/m^2/24$ hours is desired. Likewise, in some embodiments a moisture vapor transmission rate ranging from 130 to 1870 $g/m^2/24$ hours is desirable, while in some other embodiments a moisture vapor transmission rate ranging from 250 to 1870 $g/m^2/24$ hours is desirable. Preferably, in some embodiments the WRB meets "dry-cup" water vapor transmission of a minimum of 5 perms, per ASTM E96/E96M.

The water-resistant barrier (WRB) sheet has an inner face and an outer face. The inner face of the WRB sheet is attached to a face of the structural board. The structural board has an inner face that is attached to the framing of the building. Specifically, however, a face of the structural board (typically the outer face) is discontinuously attached to the inner face of the water-resistant barrier sheet solely by a first adhesive with the water-resistant barrier sheet fully covering the face of the structural board. In so doing, the composite structural board has attached areas between the face of the structural board and the inner face of the water-resistant barrier sheet, and unattached areas between the face of the structural board and the inner face of the water-resistant barrier sheet. These unattached areas between the face of the structural board and the inner face of the water-resistant barrier sheet further define paths by which a liquid can move between the face of the structural board and the inner face of the water-resistant barrier sheet. This prevents liquid moisture from being trapped in the wall and causing degradation of the wall materials.

Figure 4:
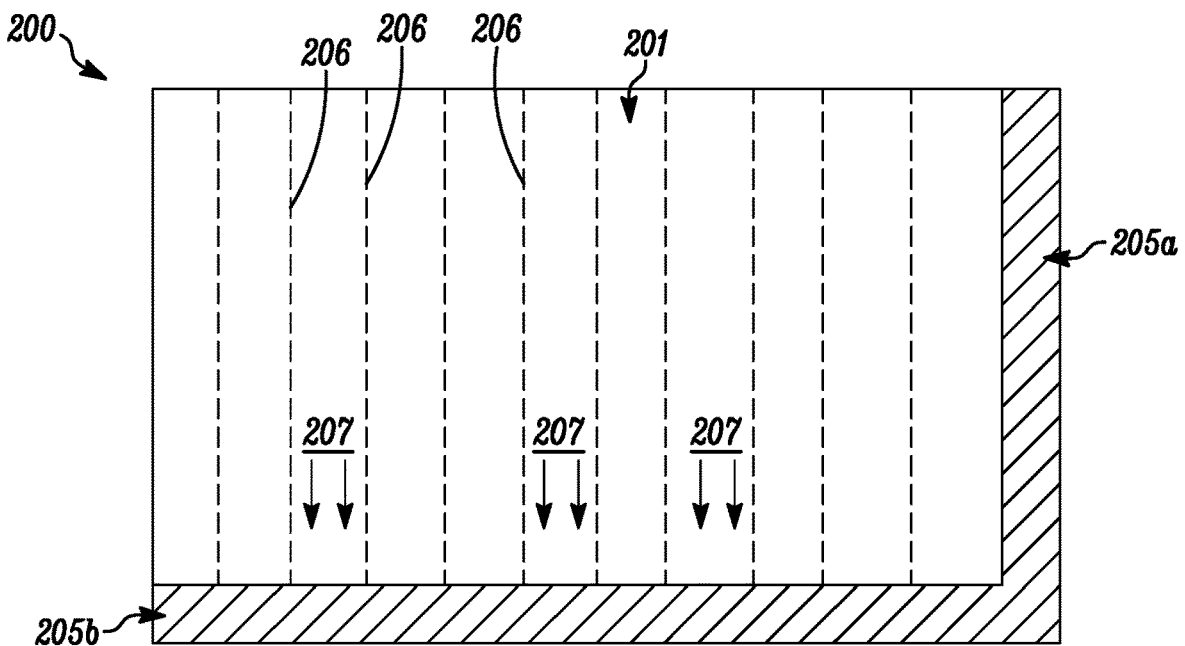
FIGS. 4-7 are a few select illustrations of possible arrangements of discontinuous attachments of the structural board to the water-resistant barrier sheet solely by a first adhesive.

FIG. 4 provides an illustration of one possible arrangement of discontinuous attachments of the structural board to the water-resistant barrier sheet solely by a first adhesive. Shown is composite structural board 200 comprising a structural board 201 and a WRB sheet. In this view, attached to the opposite side of the structural board is the water-resistant barrier sheet, and the water-resistant barrier sheet flaps are shown extending past the edge of the face of the structural board in both in the horizontal and vertical directions, forming a vertical water-resistant barrier sheet flap 205a and a horizontal water-resistant barrier sheet flap 205b. Ten vertical and discontinuous lines of adhesive, shown in the figure as dotted lines 206, are located between the structural board and the water-resistant barrier sheet, discontinuously attaching the two together. This is an illustration of attached areas, the ten discontinuous lines of adhesive 206, and unattached areas, of which there are 11 channels 207 formed and shown by the double arrows in the figure, which are defined paths by which a liquid can move between the face of the structural board and the inner face of the water-resistant barrier sheet. Any liquid that forms or travels between the structural board and the water-resistant barrier sheet can easily drain vertically via the channels 207.

As can be appreciated from FIGS. 4-7, the discontinuous adhesive can be provided and oriented in various ways. One preferred manner, as shown, is to apply the adhesive in spaced apart lines of discontinuous lines of adhesive. This feature allows for multiple defined paths by which the liquid can move between the face of the structural board and the inner face of the water-resistant barrier sheet and further eliminates the need for the composite structural board to be oriented a certain way to perform as designed. That is, the liquid can travel in paths between the spaced apart lines of discontinuous lines of adhesive, or in paths through of discontinuous lines of adhesive or utilize a combination of these paths. These "paths through" the discontinuous lines are actual gaps in the applied lines of adhesive where no adhesive is applied, resulting in the lines of adhesive being "discontinuous lines of adhesive".

Figure 5:
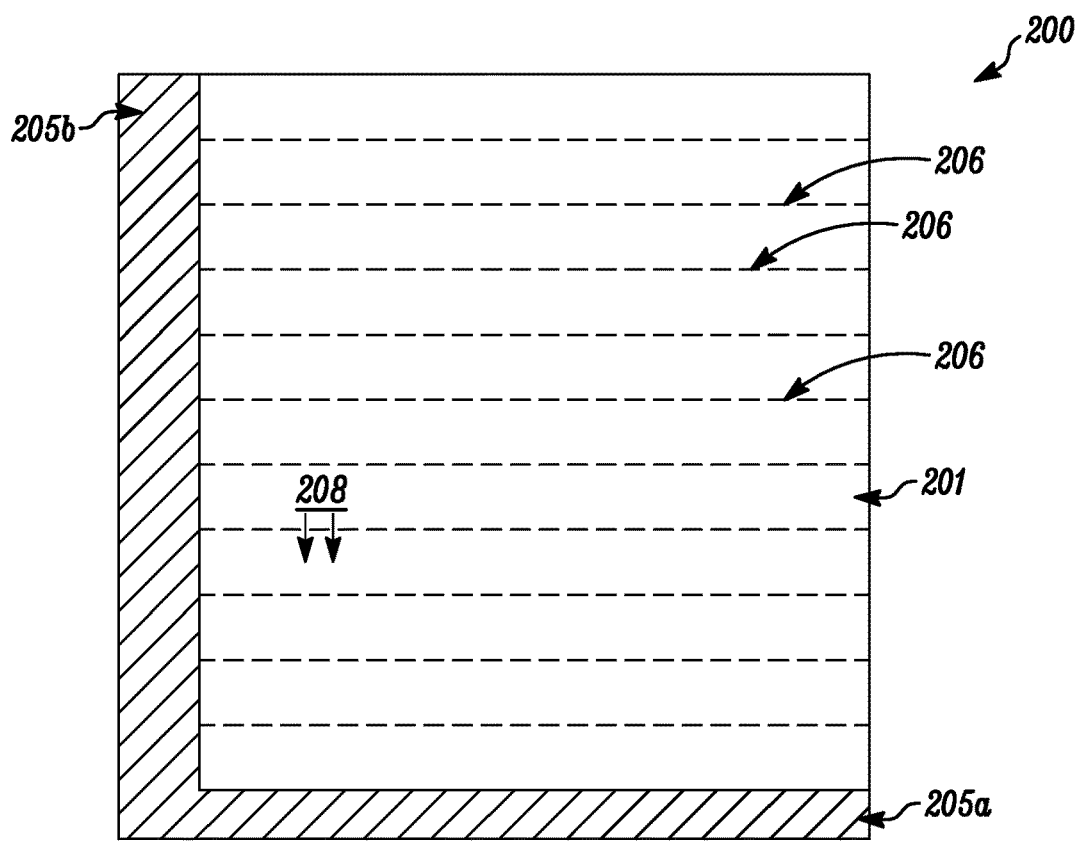

FIG. 5 illustrates the composite structural board arrangement of FIG. 4 can be rotated 90 degrees and still provide, through the discontinuous lines of adhesive 206, unattached areas that define paths by which a liquid can move between the face of the structural board and the inner face of the water-resistant barrier sheet. In this illustration, channels 208, shown by arrows in the figure, are formed by the gaps in the discontinuous lines of adhesive.

Figure 6:
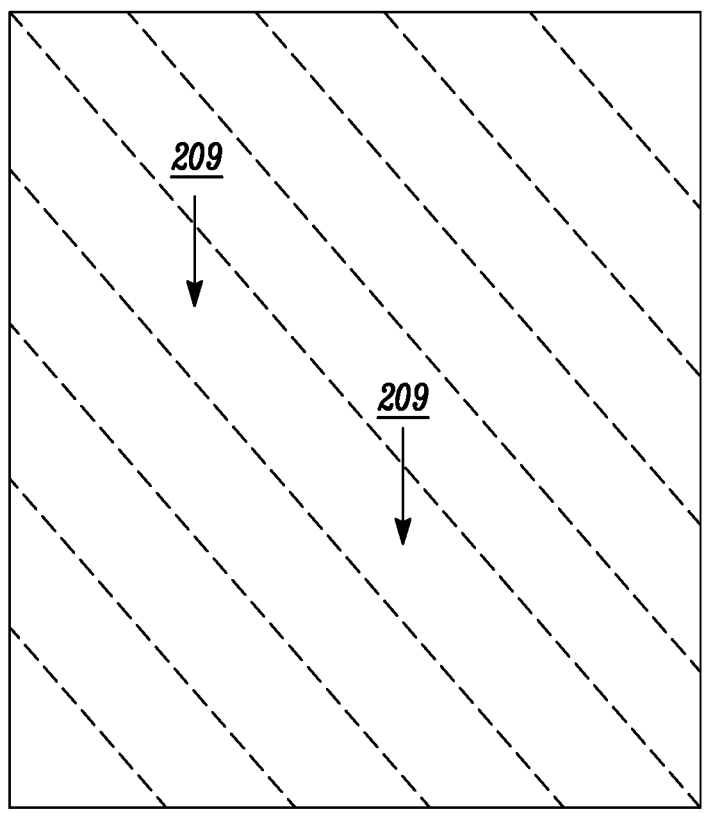
Figure 7:
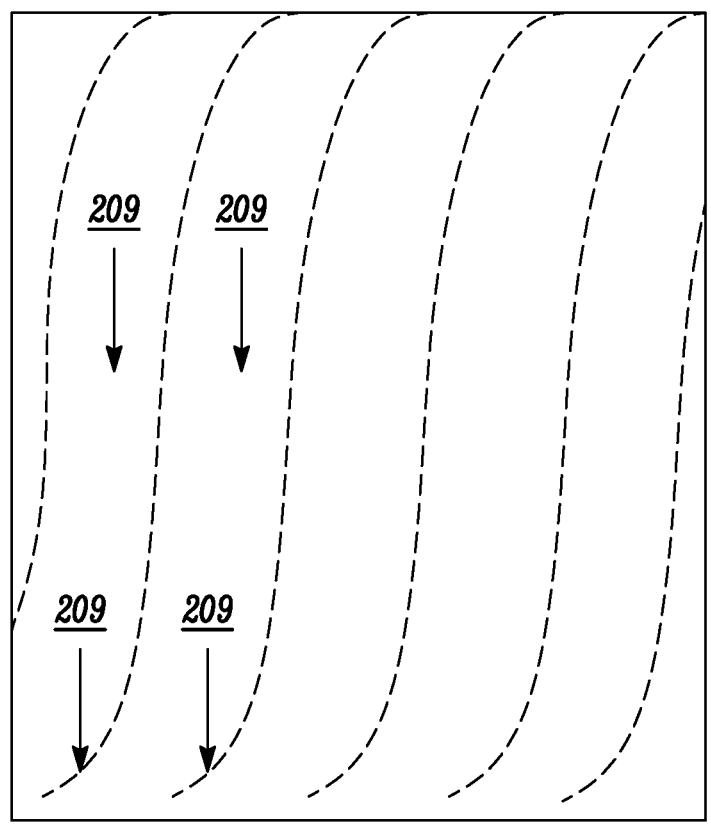

Likewise, FIGS. 6 & 7 illustrate other possible application patterns for the discontinuous lines of adhesive wherein the paths 209 by which a liquid can move between the face of the structural board and the inner face of the water-resistant barrier sheet, utilizing a combination of paths between the lines of adhesive and through gaps in the individual discontinuous lines of adhesive.

In some preferred embodiments, each of the discontinuous lines of the either permanent or non-permanent adhesive between the structural board and the WRB are applied as a longitudinal bead of adhesive to provide adequate amounts of adhesive between the faces of the structural board and the WRB to account for potential localized non-uniformities in the surface of the structural board (e.g. for OSB boards). Further, in many embodiments the longitudinal bead of adhesive is applied to the structural board, followed by pressing the WRB onto the adhesive to spread the adhesive between the faces of the structural board and the WRB. In some preferred embodiments, when WRB sheet flaps are present, the peelable adhesive used to removably attach together the two faces of the WRB is preferably applied as a spray.

In some embodiments, discontinuous lines of permanent adhesive are applied between the structural board and the WRB such that the lines of adhesive are spaced apart approximately 16 inches, and the preferred spacing between discontinuous lines of permanent adhesive can range from about 12 inches to about 24 inches apart.

In some embodiments, discontinuous lines of non-permanent adhesive are applied between the structural board and the WRB such that the lines of adhesive are spaced apart a linear distance of approximately 8 inches, and the preferred spacing between discontinuous lines of permanent adhesive can range from about 4 inches to about 16 inches apart. In some preferred embodiments, discontinuous lines of non-permanent adhesive are applied between layers of the WRB such that the lines of adhesive are spaced apart approximately 4 inches, and the preferred spacing between discontinuous lines of non-permanent adhesive can range from about 2 inches to about inches apart.

Further, the lines of adhesive are considered discontinuous because they are discontinuously applied to the faces of either the structural board or the WRB; the adhesive lines being applied to the structural board leaving a set of preferably regular gaps in each adhesive line. These gaps in the binding of the faces provide paths for any moisture to travel through the lines of adhesive. The linear length of the gaps in the discontinuous lines of adhesive is dependent on the strength of the adhesive and the intended use, but in many preferred embodiments, the gaps in applied adhesive (the linear distance wherein no adhesive is present) in the discontinuous lines of adhesive generally range from about 5 to 25 centimeters (about 2 inches to 10 inches).

The composite structural board of any or all of the prior embodiments can further comprise an area or border along at least one edge of the structural board, having a length of about 5 to 25 centimeters (about 2 inches to 10 inches) from the edge of the structural board, that is free of adhesive and is unattached to the WRB. In other words, in some embodiments, it may be desirable to not apply any adhesive between the structural board and the WRB near the edge of the structural board, leaving the WRB and the structural board unattached in a section near the periphery or edge of the structural board. This is especially useful when the composite board has no WRB sheet flaps, but this feature could be combined with a composite board provided with WRB sheet flaps. In some preferred embodiments it is advantageous to leave a border of about 5 to 15 cm (2 to 6 in) in length from the edge of the structural board unattached to the WRB. The unattached border can be on at least one edge of the composite board, or a plurality of edges of the composite structural board. In some embodiments, it may be desired to have the unattached border on all edges of the composite board, that is, around the entire periphery of the structural board. This allows the WRB around the edges of the composite structural board to be temporarily pushed aside so that the structural board can be nailed to a building stud. Once the board is nailed in place, the WRB can then be returned to its original position, and then additional tape can be applied to seal the edge of the WRB. In this fashion, the WRB at the edges of the composite structural board are not pierced by nailing.

The presence of this unattached border also provides for a unique method of sealing the abutment joint between two composite structural boards. It is especially useful in sealing a horizontal joint between two composite structural boards that a forming a wall in typical wall construction. First the WRB is pushed aside on both boards, and then the edges of the structural board are nailed or otverwise attached to the wall studs. Then, the WRB for just the lower composite structural board is returned to its original position, in face-to-face contact with the structural board. Then, while the edge of the WRB for the upper composite structural board remains pushed aside, the edge of the WRB on the lower composite structural board is horizontally taped with a sealing tape, with one edge of the tape overlapping the edge of the WRB, a center region of the tape covering the abutment joint between the boards, and the other edge of the tape attached directly to the face of the upper structural board. The WRB for the upper composite board is then allowed to return to its original position by gravity.

Figure 8C:
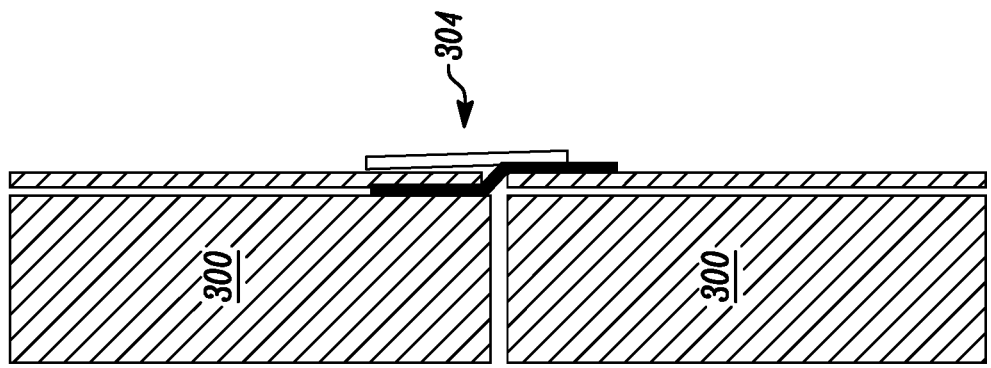
FIGS. 8a, 8b, and 8c illustrate a method of sealing the abutment joint between two composite structural boards.
Figure 8B:
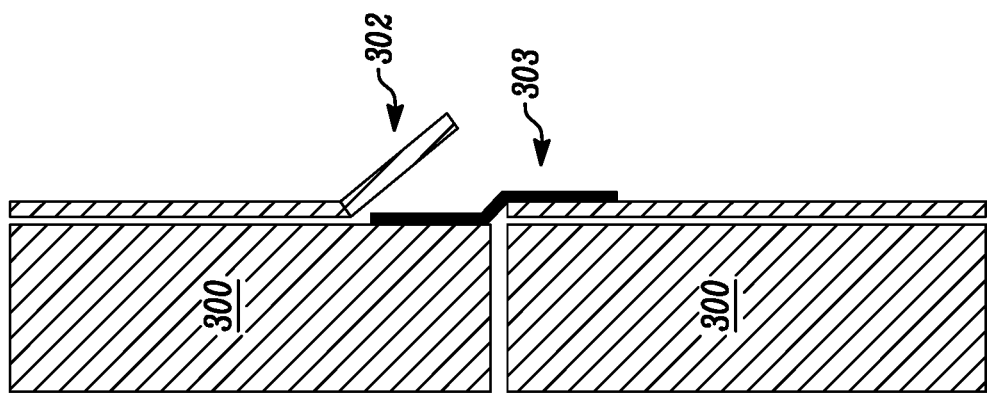
Figure 8A:
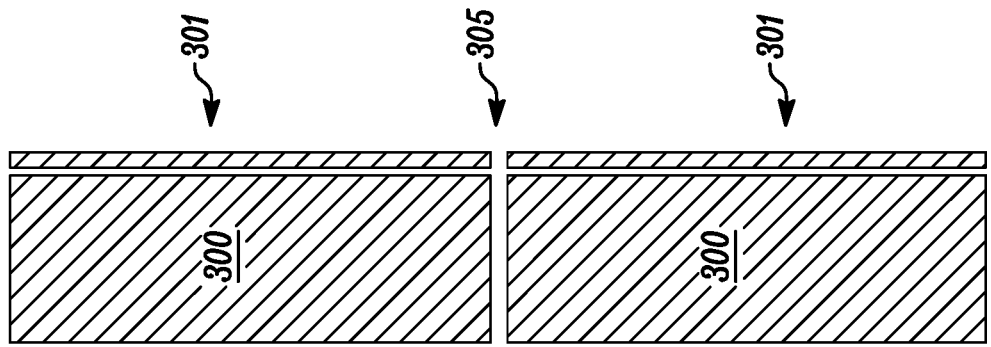

This feature is illustrated in FIGS. 8a, 8b, and 8c. As shown in FIG. 8a, two composite structural boards are shown forming a surface in the same plane, resulting in a planar wall, each composite structural board comprising a structural board 300 and a WRB 301 adhesively applied to the board. The edges of the two composite structural board meet at abutment joint 305; a gap is shown between the board for illustration, however the edges of the two boards could be touching. (In real installations, the joint will not be uniform, with various gaps possible in the joint.) As shown in FIG. 8b, a portion 302 of the WRB of the upper composite board is raised, and a sealing tape 303 is applied to the surface of the upper structural board that also covers the abutment joint 305 and a portion of the surface (the edge) of the WRB of the lower composite board. Gravity will then return the portion 302 of the WRB that was raised back to essentially its original position in face-to-face contact with the sealing tape that is now between the upper structural board and the WRB. Optionally, if desired as shown in FIG. 8c, additional sealing tape 304 can be applied to the exterior of the taped assembly, sealing the portion 302 of the WRB to the previously taped area. Depending on the exact application position and width of the sealing tape 304, the tape may also extend to the surface of the WRB of the lower composite board.

This provides a shingling effect between the two composite boards, with the horizontal edge of the WRB for the upper board overlapping the portion of the sealing tape directly attached to the structural board underneath the WRB. If desired, additional sealing tape can be now applied to the horizontal edge of the WRB of the upper composite board, sealing that edge to the surface of the previously-taped seam and, if the tape is wide enough, the outer surface of the WRB. It is also envisioned that the sealing tape can have adhesive on both sides so that the horizontal edge of the WRB of the upper composite board can be sealed simply by pressing that upper edge back onto the sealing tape beneath the edge.

Further, while much of this description is directed to sealing a horizontal seam, obviously the technique can be applied to any seam in a wall or any door/window opening in the wall, including other penetrations e.g., for utilities, etc.

This shingling effect can also be used with composite structural boards wherein the adhesive is applied between the WRB and the structural board up to or near the edge of the structural board, if the adhesive is a non-permanent adhesive. In this embodiment, a portion of the WRB is first separated from the edge of the first board, and tape is applied and adhered to the structural board underneath that WRB, covering in addition the abutment joint between that first board and a second board, and also adhering the surface of the edge of the WRB of the second board. The portion of the WRB that was first separated from the edge of the first board can then be pressed back into position, adhering that WRB to the surface of the tape that has been applied underneath it to the structural board. If desired, additional tape can be applied to the surface of the edge of the re-attached WRB, sealing that edge to the surface of the previously-taped seam and, if the tape is wide enough, the outer surface of the WRB of the second composite board.

Likewise, the composite structural board of any or all of the prior embodiments can further comprise an area or border along at least one edge of the structural board, having a length of about 5 to 25 centimeters (about 2 inches to 10 inches) from the edge of the structural board, that is solely the non-permanent adhesive. In other words, in some embodiments, it may be desirable to apply the non-permanent adhesive between the structural board and the WRB near the edge of the structural board, leaving a section near the periphery or edge of the structural board that can be peeled apart for nailing or taping and then re-applied. This is especially useful when the composite board has no WRB sheet flaps, but this feature could be combined with a composite board provided with WRB sheet flaps. In some preferred embodiments it is advantageous to have a border of about 5 to 15 cm (2 to 6 in) in length from the edge of the structural board with the non-permanent adhesive. This border can be on at least one edge of the composite board, or a plurality of edges of the composite structural board. In some embodiments, it may be desired to have the border comprising a non-permanent adhesive on all edges of the composite board, that is, around the entire periphery of the structural board.

The present invention further includes a wall system comprising the composite structural board having any or all of the embodiments discussed herein.

In one embodiment, the wall system comprises a plurality of the composite structural boards, wherein the plurality of composite structural boards forms a surface in the same plane, with at least one edge of one of the structural boards forming an abutment joint at least one edge of an adjacent structural board,
  the composite structural board comprising
  a) a structural board; and
  b) a water-resistant barrier sheet having a basis weight 100 g/m² or less, a hydrostatic head of 55 cm or greater, a Gurley Hill porosity of 250 seconds or greater, and a moisture vapor transmission rate, of at least 130 g/m²/24 hrs, the water-resistant barrier sheet having an inner face and an outer face; and wherein a face of the structural board is discontinuously attached to the inner face of the water-resistant barrier sheet solely by a first adhesive, the water-resistant barrier sheet fully covering the face of the structural board; wherein the composite structural board has
  i) attached areas between the face of the structural board and the inner face of the water-resistant barrier sheet, and
  ii) unattached areas between the face of the structural board and the inner face of the water-resistant barrier sheet;
  the unattached areas between the face of the structural board and the inner face of the water-resistant barrier sheet defining paths by which a liquid can move between the face of the structural board and the inner face of the water-resistant barrier sheet;

In some other embodiments, the wall system comprises a plurality of the composite structural boards, wherein the plurality of composite structural boards forms a surface in the same plane, with at least one edge of one of the structural boards forming an abutment joint at least one edge of an adjacent structural board, and
  wherein the water-resistant barrier sheet material extending beyond the at least one edge of the structural board forming a water-resistant barrier sheet flap covers the abutment joint,
  the composite structural board comprising
  a) a structural board; and
  b) a water-resistant barrier sheet having a basis weight 100 g/m² or less, a hydrostatic head of 55 cm or greater, a Gurley Hill porosity of 250 seconds or greater, and a moisture vapor transmission rate, of at least 130 g/m²/24 hrs, the water-resistant barrier sheet having an inner face and an outer face; and wherein a face of the structural board is discontinuously attached to the inner face of the water-resistant barrier sheet solely by a first adhesive, the water-resistant barrier sheet fully covering the face of the structural board; wherein the composite structural board has
    i) attached areas between the face of the structural board and the inner face of the water-resistant barrier sheet, and
    ii) unattached areas between the face of the structural board and the inner face of the water-resistant barrier sheet;
  the unattached areas between the face of the structural board and the inner face of the water-resistant barrier sheet defining paths by which a liquid can move between the face of the structural board and the inner face of the water-resistant barrier sheet; and
  wherein the face of the structural board has at least one edge, with the water-resistant barrier sheet extending a distance of five to thirty centimeters beyond the at least one edge of the structural board, the water-resistant barrier sheet material extending beyond the at least one edge of the structural board forming a water-resistant barrier sheet flap.

In some other embodiments, the wall system comprises a plurality of the composite structural boards as previously described herein, wherein the wall system was made using at least one composite structural board having a water-resistant barrier sheet flap, the water-resistant barrier sheet flap folded upon and demountably attached to the outer surface of the water-resistant barrier sheet, such that when a delamination force of 7 N/10 mm or less is imposed on the water-resistant barrier sheet flap it can be separated from the outer surface of the water-resistant barrier sheet.

In some other embodiments, the wall system comprises a plurality of the composite structural boards as previously described herein, wherein the plurality of composite structural boards forms a surface in the same plane, with at least one edge of one of the structural boards forming an abutment joint at least one edge of an adjacent structural board, wherein at least one structural board is provided with gasket material positioned in the plane of the structural board, attached to the edge of the structural board.

In some other embodiments, the wall system comprises a plurality of the composite structural boards as previously described herein, wherein the plurality of composite structural boards forms a surface in the same plane, with at least one edge of one of the structural boards forming an abutment joint at least one edge of an adjacent structural board, wherein at least one composite structural board further comprises an area or border along at least one edge of the structural board of length of about 5 to 25 centimeters (about 2 inches to 10 inches) from the edge of the structural board that is free of adhesive and is unattached to the WRB.

In some other embodiments, the wall system comprises a plurality of the composite structural boards as previously described herein, wherein the plurality of composite structural boards forms a surface in the same plane, with at least one edge of one of the structural boards forming an abutment joint at least one edge of an adjacent structural board, wherein at least one composite structural board further comprises an area or border along at least one edge of the structural board of length of about 5 to 25 centimeters (about 2 inches to 10 inches) from the edge of the structural board that is attached to the WRB solely with a non-permanent adhesive.

Building Modules

The composite structural boards comprising a structural board and a water-resistant barrier sheet (WRB) described herein are also useful in prefabricated building modules that can be assembled to construct multi-story buildings such as hotels, hospitals and apartments.

Figure 9:
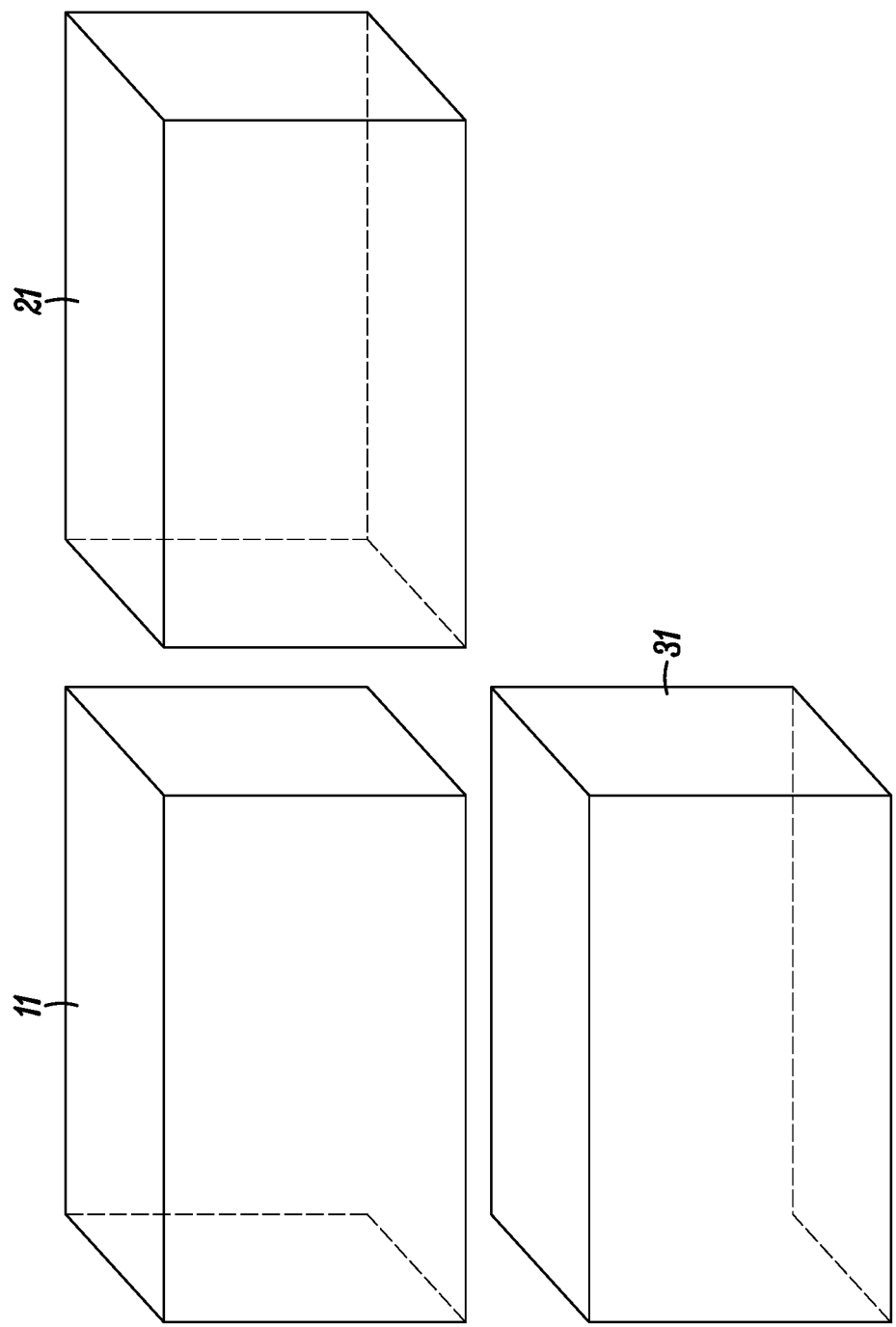
FIG. 9 shows a general view of building modules.

FIG. 9 shows a general view of the spatial arrangement of three building modules 11, 21 and 31, also referred to herein as first, second and third building modules respectively. Modules 11 and 21 are positioned in a horizontal relationship with respect to each other while modules 11 and 31 are positioned in a vertical relationship with respect to each other.

Figure 14:
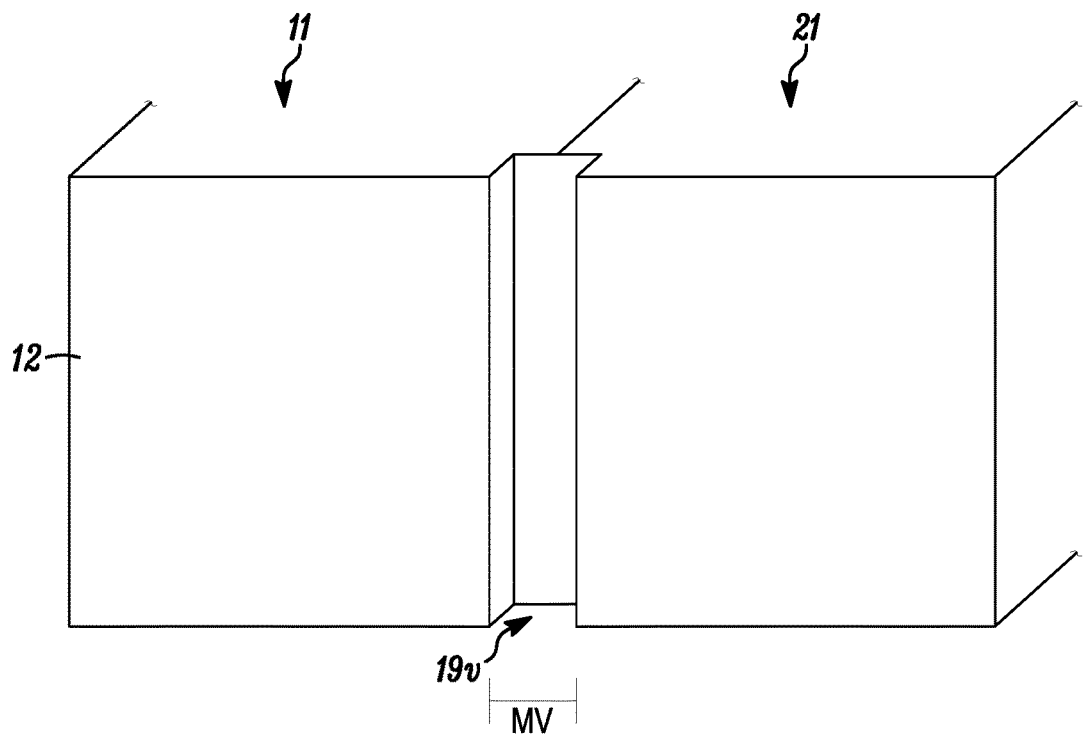
FIG. 14 shows a vertical mate line between two building modules.

FIG. 14 is another view of modules 11 and 21. Although the two modules are connected, this connection is broken at the front of the modules to accommodate vertical mate line $19_v$. The mate line has a width MV.

Figure 15:
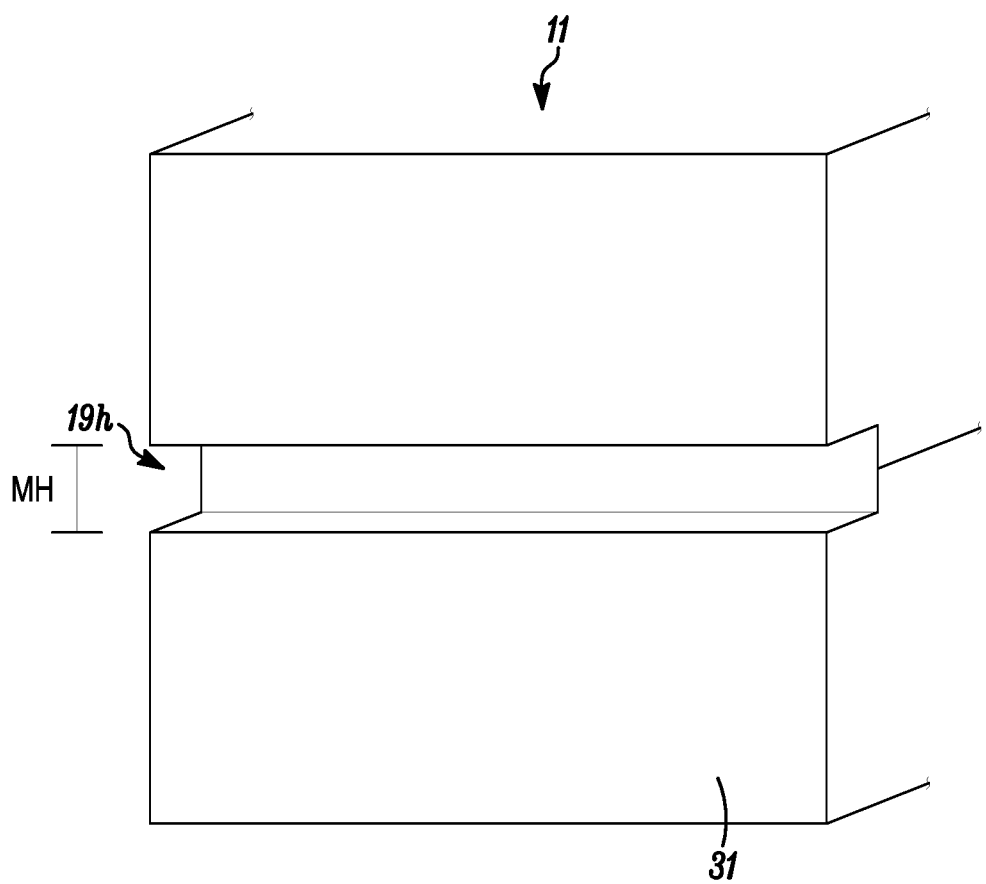
FIG. 15 shows a horizontal mate line between two building modules.

FIG. 15 is another view of modules 11 and 31 and in a similar way to FIG. 14 shows a horizontal mate lane $19_h$ having a width MH.

Vertical and Horizontal Mate Line Closure Flaps.

Figure 10:
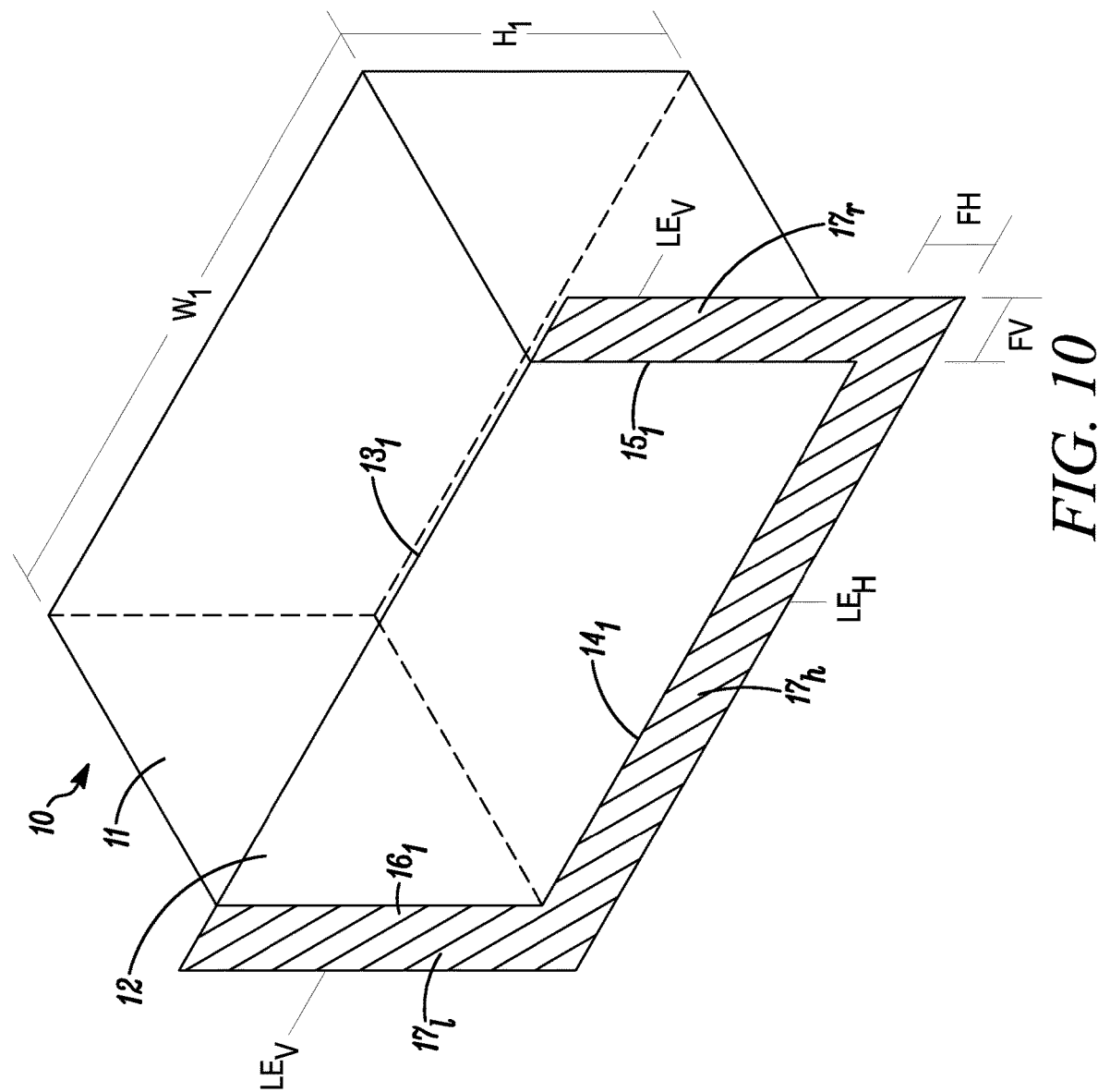
FIG. 10 is a perspective of a first building module.

FIG. 10 shows generally at 10 a view of building module 11, the first building module. The module has a height $H_1$ and width $W_1$. The module further has an external wall 12, a top edge $13_1$, a bottom edge $14_1$, a right vertical edge $15_1$ and a left vertical edge $16_1$. The external wall comprises sheathing having a WRB sheet affixed to and covering the entire outer surface of the sheathing.

FIG. 10, further shows WRB sheet flaps, a right vertical flap $17_r$, a left vertical flap $17_l$ and a horizontal flap $17_h$. The flaps also have longitudinal edges $LE_v$ for the vertical flaps and $LE_H$ for the horizontal flaps.

Figure 13:
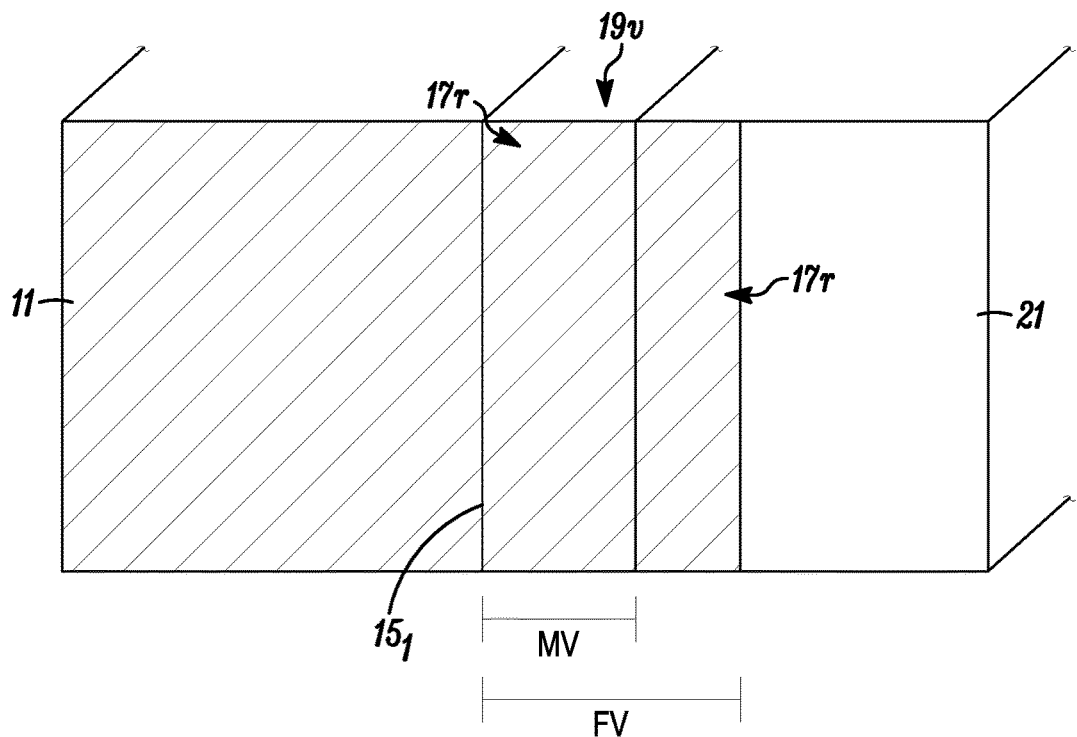
FIG. 13 shows a barrier flap extending from a first building module onto a second building module.

FIG. 13, shows a first module 11, a second module 21 and a vertical mate line space $19_v$ between the external faces of the two modules. The WRB sheet of the first module is shown hatched and further extends a distance FV beyond the right vertical edge $15_1$ of the first module to form a vertical flap $17_r$ covering the mate line and further extending over onto the WRB sheet of the second module. The distance FV is the width of the flap. Preferably, the distance FV exceeds the width MV of the vertical mate line to be covered by at least 152 mm or even by about 250 mm.

Referring again to FIG. 10, in a similar way, a vertical flap $17_l$ could also be formed for the other side of the module at the left vertical edge to cover any mate line in that location. A similar relationship between FV and MV applies here. In some embodiments, there may only be one vertical flap while in others there may be two.

Likewise, horizontal flap $17_h$ extends a distance FH (FIG. 10), the width of the flap, beyond the lower edge $14_1$ of the first module covering the horizontal mate line having a width MH (FIG. 15). Preferably, the distance FH exceeds the width MH of the horizontal mate line to be covered by at least 50 mm or by 101 mm or even by about 200 mm.

Water-Resistant Barrier Sheet

The water-resistant barrier (WRB) sheet is a sheet that does not allow movement of fluid through the sheet but does permit movement of vapor, such as water vapor. In some embodiments, the WRB sheet is polymeric. Preferred polymeric sheets are polyethylene (PE) or polypropylene (PP). A suitable polyethylene sheet is a nonwoven web of flash-spun plexifilamentary high-density PE (HDPE) fibers available from DuPont, Wilmington, DE under the tradename TYVEK. A suitable polypropylene substrate is available under the tradename TYPAR.

Support Member

Figure 11:
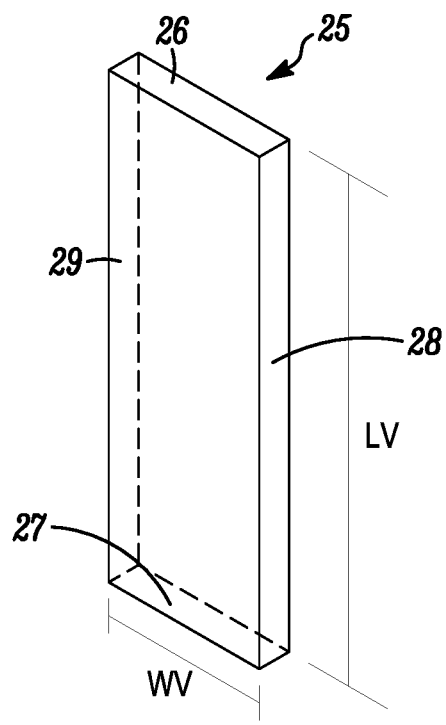
FIGS. 11 and 12 are respective views of embodiments of a vertical and horizontal support member.
Figure 12:
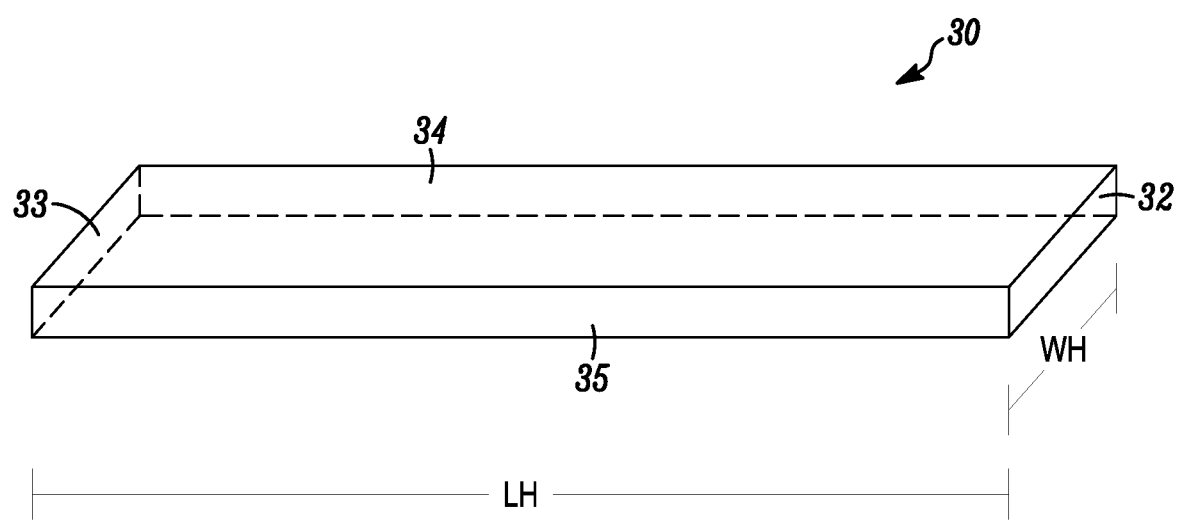

The support member is a rigid strip of material as exemplified in FIG. 11 for a vertical support member and in FIG. 12 for a horizontal support member. The material may be wood, fibrous, metallic or plastic. A fibrous support member may be natural or synthetic in origin.

A preferred material is wood in the form of a furring strip. In construction, furring strips are thin strips of wood, fiber or other material. "Furring" refers to the process of installing the strips and to the strips themselves. Furring strips are also known as battens and sometimes strapping. Preferably the furring strips described herein are wooden and have dimensions of about 25.4 mm thick and 25.4-76.2 mm wide. A preferred width is about 50 mm. Strip lengths may be up to about 2.5 m or greater.

In FIG. 11, a vertical support member is shown generally at 25 and has a length LV, a width WV, a first end 26, a second end 27, a first face 28 and a second face 29 wherein the length LV is no greater than the height $H_1$ of the first module. In some embodiments, the length LV of the vertical support member is between 80%-98% of the height $H_1$ of the first module. In some other embodiments, the length LV of the vertical support member is between 85%-95% of the height $H_1$.

In FIG. 12, the horizontal support member 30 has a length LH, a width WH, a first end 32, a second end 33, a first face 34 and a second face 35 wherein length LH is no greater than the width $W_1$ of the first module. In some embodiments, the length LH of the horizontal support member is between 80%-98% of the width $W_1$ of the first module. In some other embodiments, the length LV of the horizontal support member is between 85%-95% of the width $W_1$.

First Fasteners

Fasteners such as screws, staples, nails, hook-and-loop, or adhesive are suitable for this purpose. A preferred adhesive is a tape. Hook-and-loop including hook-and-pile or touch fasteners consist of two components: typically, two lineal fabric strips (or, alternatively, round "dots" or squares) which are attached (sewn or otherwise adhered) to the opposing surfaces to be fastened. The first component features tiny hooks, the second features smaller loops. When the two are pressed together the hooks catch in the loops and the two pieces fasten or bind temporarily. When separated, by pulling or peeling the two surfaces apart, the strips make a distinctive "ripping" sound. An example of a hook-and-loop fastener is Velcro®. Preferred fasteners are staples.

In a preferred embodiment, fasteners are located near the upper and lower ends of the vertical support members and near the left and right outer ends of horizontal support members. Further fasteners may be positioned at about 300 mm intervals between the upper and lower ends of the vertical support members and between the left and right outer ends of horizontal support members.

Second Fasteners

Fasteners such as screws, staples, nails, hook and loop or adhesive are suitable for this purpose. A preferred adhesive is a tape. Preferred fasteners are screws.

In a preferred embodiment, fasteners are located near the upper and lower ends of vertical support members and near the left and right outer ends of horizontal support members, and, if necessary, at intervals between the upper and lower ends of the vertical support members and between the left and right outer ends of horizontal support members.

Third Fasteners

Fasteners such as screws, staples, nails, hook and loop or adhesive are suitable for this purpose. A preferred adhesive is a tape. Preferred fasteners are screws.

In a preferred embodiment, fasteners are located near the upper and lower ends of vertical support members and near the left and right outer ends of horizontal support members, and, if necessary, at intervals between the upper and lower ends of the vertical support members and between the left and right outer ends of horizontal support members.

In some embodiments, the second and third fasteners may be the same.

Fourth Fasteners

A preferred fasteners is an adhesive tape such as DuPont Tyvek® tape. The tape covers the full length of the flap edge as well as the upper and lower edges of the flap.

Method of Preparing a Vertical Mate Line Closure Flap

Referring to FIGS. 9, 10, 13 and 14, preparation of the vertical mate line closure flap comprises the steps of:

providing a first building module 11 having an external wall 12, the first module having a height $H_1$, a width $W_1$, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FV beyond either the right or left vertical edges of the first module to form a vertical flap $17_r$ or $17_l$, the flap having a longitudinal edge $LE_v$, wherein the distance FV exceeds the width (MV) of the vertical mate line $19_v$ to be covered by at least 152 mm, providing a second building module 21 located in a horizontal direction to the side of the first module 11 and having a vertical mate line 19v between the two modules, the second module having a height, a width, a top edge, a bottom edge, a right vertical edge, a left vertical edge, the second module having an external wall wherein the external wall comprises sheathing having a synthetic WRB sheet affixed to and covering the entire outer surface of the sheathing, providing a vertical support member 25 having a length LV, width WV, a first end 26, a second end 27, a first face 28 wherein length LV is no greater than the height H1 of the first module, fully extending the vertical flap 17r or 17l of the first module 11 over onto the WRB sheet of the second module 21 thereby covering the vertical mate line 19v between the first and second modules and part of the WRB sheet of the second module, positioning the vertical support member 25 underneath the extended WRB flap such that the first face 28 of the vertical support member is flush with, or in close proximity to, the longitudinal edge $LE_v$ of the flap, and the first end 26 of the member does not extend beyond the top edge $13_1$ of the first module and the second end 27 of the member does not extend beyond the bottom edge $14_1$ of the first module, attaching the WRB sheet covering the vertical support member to the support member with a first fasteners, and attaching the covered support member to the sheathing of the second module with a second fasteners.

The WRB flap should be secured to the support member at each end and at about 300 mm intervals in between.

Method of Preparing a Horizontal Mate Line Closure Flap

Referring to FIGS. 9, 10 and 15, preparation of the horizontal mate line closure flap comprises the steps of:

providing a first building module 11 having an external wall 12, the first module having a height H1, a width W1, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FH beyond the bottom edge $14_1$ of the first module to form a horizontal flap $17_h$, the flap having a longitudinal edge $LE_H$, wherein the distance FH exceeds the width MH of the horizontal mate line $19_h$ to be covered by at least 50 mm, more preferably 101 mm, providing a third building module 31 located in a vertical direction below the first module 11, the third module having a height, a width, a top edge, a bottom edge, a right vertical edge, a left vertical edge, the third module having an external wall wherein the external wall comprises sheathing having a synthetic WRB sheet affixed to and covering the entire outer surface of the sheathing, providing a horizontal support member 30 having a length LH, width WH, a first end 32, a second end 33, a first face 34 wherein length LH is no greater than the width W1 of the first module, fully extending the horizontal flap $17_h$ of the first module 11 over onto the WRB sheet of the third module 31 thereby covering the horizontal mate line $19_h$ between the first and third modules and part of the WRB sheet of the third module, positioning the horizontal support member 30 underneath the extended WRB flap $17_h$ such that the first face 34 of the horizontal support member is flush with, or in close proximity to, the longitudinal edge $LE_H$ of the flap, and the first end 32 of the support member does not extend beyond the right vertical edge $15_1$ of the first module and the second end 33 of the support member does not extend beyond the left vertical edge $16_1$ of the first module, attaching the WRB sheet covering the horizontal support member to the support member with a first fasteners, attaching the covered support member to the sheathing of the third module with a second fasteners, The WRB flap should be secured to the support member at each end and at about 300 mm intervals in between.

Method of Accessing a Vertical Mate Line

Accessing the horizontal mate line comprises the steps of:

removing the fasteners securing the horizontal support member to the sheathing of the third module, folding the horizontal support member and WRB sheet back over the mate line so as to overlap the sheathing of the first module by a distance sufficient to expose the mate line, and securing the covered support member to the sheathing of the first module by a third fasteners.

Method of Accessing a Horizontal Mate Line

Accessing the horizontal mate line comprises the steps of:

removing the fasteners securing the horizontal support member to the sheathing of the third module, folding the horizontal support member and WRB sheet back over the mate line so as to overlap the sheathing of the first module by a distance sufficient to expose the mate line, and securing the covered support member to the sheathing of the first module by a third fasteners.

Method of Closing a Vertical Mate Line

Closing the vertical mate line comprises the steps of:

removing the fasteners securing the vertical support member to the sheathing of the first module, fully extending the vertical flap back over the mate line so as to cover the mate line, and attaching the covered support member to the sheathing of the second module with a second fasteners.

Where the vertical flap is at the corner of a building, the flap wraps around the corner and the vertical support member is secured in the same manner to the sheathing of the adjacent module.

Method of Closing a Horizontal Mate Line

Closing the horizontal mate line comprises the steps of:

removing the fasteners securing the horizontal support member to the first module, fully extending the vertical flap back over the mate line so as to cover it and attaching the covered support member to the sheathing of the third module with a second fasteners.

Repeated Opening and Closing of Mate Lines

The vertical and horizontal mate line access and closing processes are repeated as required during building work until all installations and inspections have been completed. When practical, the support member should be fastened in the same holes as previously used.

Method of Sealing a Horizontal Mate Line

Preferably, the horizontal mate line should be sealed before sealing the vertical flap. Carrying out the horizontal mate line sealing process to complete the building weatherization comprises the steps of:

removing the fasteners used to secure the horizontal support member to the first or third module, cutting the WRB flap along its length $LE_H$ close to the support member so as to free it from the support member, ensuring the WRB flap covers the mate line and fully extends onto the surface of the third module, and attaching the flap to the sheathing of the third module with a fourth fasteners so as to seal all three edges of the flap.

All holes in the WRB sheet created by the various fasteners should be sealed by a water-resistant barrier tape such as DuPont Tyvek® tape.

Method of Sealing a Vertical Mate Line

Carrying out the vertical mate line sealing process to complete the building weatherization comprises the steps of:

removing the fasteners used to secure the vertical support member to the first or second module, cutting the WRB flap along its length $LE_V$ close to the support member so as to free it from the support member, ensuring the WRB flap covers the mate line and fully extends onto the surface of the second module, and attaching the flap to the sheathing of the second module with a fourth fasteners so as to seal all three edges of the flap.

All holes in the WRB sheet created by the various fasteners should be sealed by a water-resistant barrier tape such as DuPont Tyvek® tape.

Horizontal Mate Line at Ground Level

In some circumstances there may also be a need for a mate line at ground level. In such a case and referring to FIG. 10, preparation of the horizontal mate line closure flap comprises the steps of providing a first building module 11 having an external wall 12, the first module having a height H1, a width W1, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FH beyond the bottom edge $14_1$ of the first module to form a horizontal flap $17_h$, the flap having a longitudinal edge $LE_H$, wherein the distance FH exceeds the width MH of the horizontal mate line $19_h$ only to the extent necessary to cover the horizontal mate line and, if necessary, wrap the WRB flap around the horizontal support member prior to attaching it to the support member.

The support member is secured to the WRB flap with the first fasteners as previously described and is then left hanging free to cover the horizontal mate line. Alternatively, the support member may be temporarily affixed to the building foundation.

Accessing the horizontal mate line comprises the steps of folding the horizontal support member and WRB sheet back over the mate line so as to overlap the sheathing of the first module by a distance sufficient to expose the mate line, and securing the support member to the sheathing of the first module by a third fasteners.

Closing the horizontal mate line comprises the steps of removing the fasteners securing the horizontal support member to the first module and allowing the support member to drop down and hang freely thus covering the mate line. Alternatively, the support member may be temporarily affixed to the building foundation.

The horizontal mate line sealing process to complete the building weatherization at ground level comprises the steps of:
- removing the fasteners used to secure the horizontal support member to the first module,
- cutting the WRB flap along its length $LE_H$ close to the support member so as to free it from the support member,
- trimming the WRB flap to size such that it fully covers the mate line, and sealing the end of the flap to the foundation flashing or to concrete. Suitable sealers include self-adhesive tape, flashing tape, a sealant or caulk.

Window and Door Openings

Figure 16:
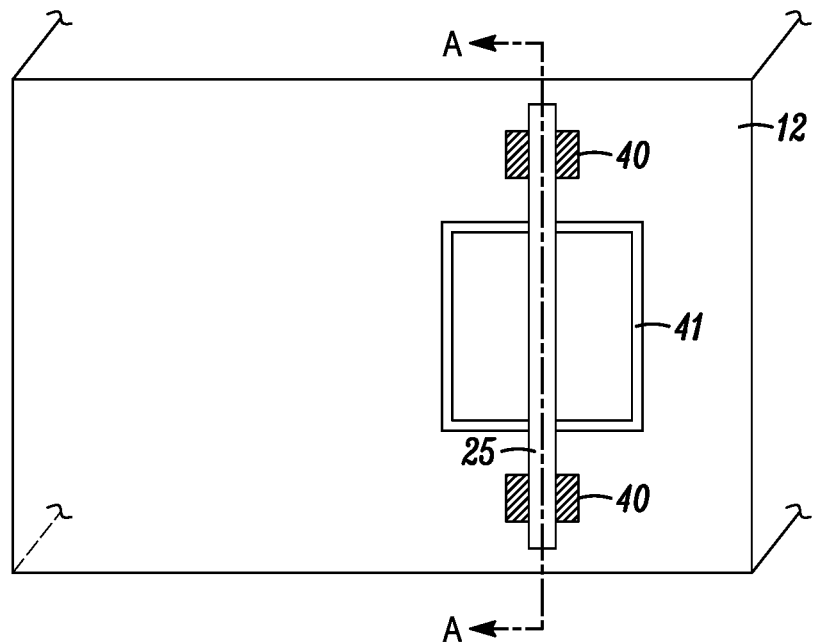
FIGS. 16-18 are views of support members positioned over building windows.
Figure 17:
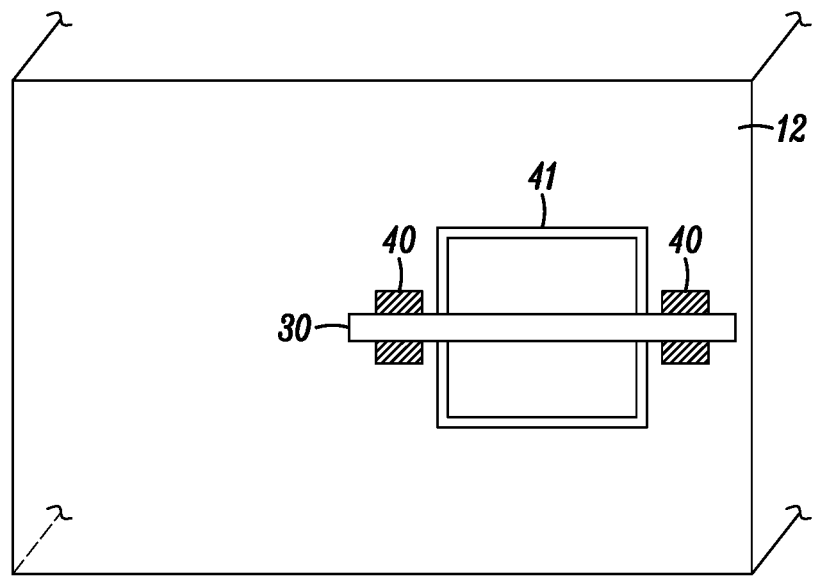
Figure 18:
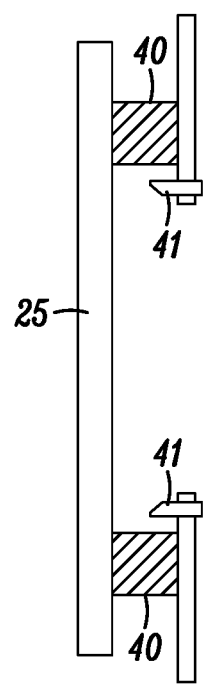

In some embodiments, the external wall has an opening for a window or door. In many cases, the sills of the window or door jambs extend beyond the plane of the WRB covered sheathing and could interfere with the positioning of the support member and flap. To overcome this, spacer blocks, preferably of wood, are affixed to the sheathing and, preferably, positioned no less than about 150 mm either side of window sills or door jambs or about 230 mm from the head of window rough openings such that the blocks protrude beyond the window sills or door jambs to provide fixing points for either a vertical or horizontal support member. Additional folds of the flap may be required to ensure correct positioning of the support member. The support member and flap is then fastened to the spacer block. FIGS. 16 and 17 show a view of spacer blocks 40 with attached support members 25 or 30 for a vertical and horizontal flap respectively. For convenience the WRB flap is not shown. The window frame is shown at 41. FIG. 18 is a sectional view through AA of FIG. 16 and further illustrates the relationship of the window frame, the spacer blocks and the support member. A similar concept applies for door frames.

Module Assembly

Figure 19:
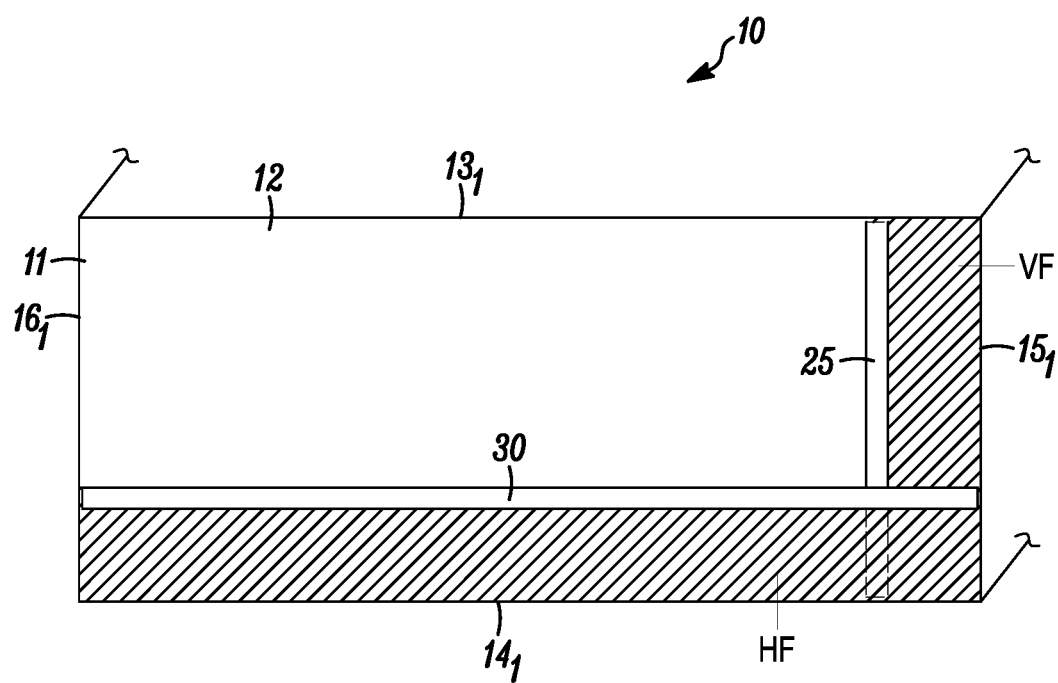
FIG. 19 is a view of one embodiment a "ready to ship" building module having mate line flaps attached to the sheathing of the module.

To facilitate shipping and on-site installation, some modules may have the support member attached to the WRB flap prior to leaving the module assembly site. FIG. 19 shows and example of this. The module 11 has an external wall 12, a top edge $13_1$, a bottom edge $14_1$, a right vertical edge $15_1$, and a left vertical edge $16_1$. The external wall comprises sheathing having a WRB sheet affixed to and covering the entire outer surface of the sheathing. The WRB sheet further comprises a vertical flap VF and a horizontal flap HF both shown as hatched in the figure. Vertical and horizontal support members 25 and 30 are attached to the outer edges of the vertical and horizontal flaps respectively by the first fasteners. The vertical flap is folded back over the module sheathing and the support member attached to the sheathing by the second fasteners. This process is then repeated for the horizontal flap.

Test Methods

Moisture Vapor Transmission Rate (MVTR) known as "wet cup" MVTR is determined by ASTM E398-83 (the "LYSSY" method) and is based on a pressure gradient of 85% relative humidity ("wet space") vs. 15% relative humidity ("dry space"). The LYSSY method measures the moisture diffusion rate for just a few minutes and under a constant humidity delta, which measured value, is then extrapolated over a 24 hour period. MVTR is reported in g/m2/24 hrs.

Moisture vapor transmission known as "dry cup" MVTR is determined by per ASTM E96/E96M and is also reported in g/m2/24 hrs.

Hydrostatic Head was determined by ATTCC 127 and is a measure of the resistance of the sheet to penetration by liquid water under a static load. A 17.78 cm×17.78 cm sample is mounted in a SDL 18 Shirley Hydrostatic Head Tester (manufactured by Shirley Developments Limited, Stockport, England). Water is pumped against one side of a 102.6 cm section of the sample at a rate of 60+/−3 cm/min until three areas of the sample are penetrated by the water. The hydrostatic pressure is measured in inches, converted to SI units and reported in centimeters of water. The test generally follows ASTM D 583 (withdrawn from publication November, 1976).

Gurley-Hill Porosity was measured in accordance with TAPPI T-460 using a Lorentzen & Wettre Model 121 D Densometer. This test measures the time of which 100 cubic centimeters of air is pushed through a one inch diameter sample under a pressure of approximately 12.4 cm of water. The result is expressed in seconds and is usually referred to as Gurley Seconds.

Basis Weight was determined according to ASTM D-3776 and reported in $g/m^2$.

We claim:

1. A composite structural board comprising:
   a) a structural board; and
   b) a water-resistant barrier sheet having a basis weight 100 $g/m^2$ or less, a hydrostatic head of 55 cm or greater, a Gurley Hill porosity of 250 seconds or greater, and a moisture vapor transmission rate, of at least 130 g/m2/24 hrs, the water-resistant barrier sheet having an inner face and an outer face; and
   wherein a face of the structural board is discontinuously attached to the inner face of the water-resistant barrier sheet by a permanent adhesive and a non-permanent adhesive, wherein the board has a section using the non-permanent adhesive between the structural board and the water-resistant barrier sheet that can be peeled apart from the board for nailing or taping and then re-applied, the water-resistant barrier sheet fully covering the face of the structural board;

wherein the composite structural board has i) attached areas between the face of the structural board and the inner face of the water-resistant barrier sheet, and ii) unattached areas between the face of the structural board and the inner face of the water-resistant barrier sheet;

the unattached areas between the face of the structural board and the inner face of the water-resistant barrier sheet defining paths by which a liquid can move between the face of the structural board and the inner face of the water-resistant barrier sheet.

2. The composite structural board of claim 1, wherein the face of the structural board has at least one edge, with the water-resistant barrier sheet extending a distance of five to thirty centimeters beyond the at least one edge of the structural board, the water-resistant barrier sheet extending beyond the at least one edge of the structural board forming a water-resistant barrier sheet flap.

3. The composite structural board of claim 2, wherein the water-resistant barrier sheet flap is folded upon and demountably attached to the outer surface of the water-resistant barrier sheet, such that when a delamination force of 7 N/10 mm or less is imposed on the water-resistant barrier sheet flap it can be separated from the outer surface of the water-resistant barrier sheet.

4. The composite structural board of claim 3 wherein the water-resistant barrier sheet flap is demountably attached to the outer surface of the water-resistant barrier sheet by a peelable adhesive.

5. The composite structural board of claim 2 wherein the structural board is provided with gasket material positioned in the plane of the structural board, attached to the edge of the structural board.

6. The composite structural board of claim 1 further comprising an area or border along at least one edge of the structural board of length of about 5 to 25 centimeters (about 2 inches to 10 inches) from the edge of the structural board that is free of adhesive and is unattached to the WRB.

7. The composite structural board of claim 2 further comprising an area or border along at least one edge of the structural board of length of about 5 to 25 centimeters (about 2 inches to 10 inches) from the edge of the structural board that is free of adhesive and is unattached to the WRB.

8. A wall system comprising a plurality of the composite structural boards of claim 1, wherein the plurality of composite structural boards forms a surface in the same plane, with at least one edge of one of the structural boards forming an abutment joint at least one edge of an adjacent structural board.

9. A wall system comprising a plurality of the composite structural board of claim 2, wherein the plurality of composite structural boards forms a surface in the same plane, with at least one edge of one of the structural boards forming an abutment joint at least one edge of an adjacent structural board, and wherein the water-resistant barrier sheet material extending beyond the at least one edge of the structural board forming a water-resistant barrier sheet flap covers the abutment joint.

10. The composite structural board of claim 1 wherein the structural board is provided with gasket material positioned in the plane of the structural board, attached to the edge of the structural board.

11. A wall system comprising a plurality of the composite structural board of claim 10, wherein the plurality of composite structural boards forms a surface in the same plane, with at least one edge of one of the structural boards forming an abutment joint at least one edge of an adjacent structural board.

12. A wall system comprising a plurality of the composite structural board of claim 5, wherein the plurality of composite structural boards forms a surface in the same plane, with at least one edge of one of the structural boards forming an abutment joint at least one edge of an adjacent structural board.

13. A wall system comprising a plurality of the composite structural board of claim 6, wherein the plurality of composite structural boards forms a surface in the same plane, with at least one edge of one of the structural boards forming an abutment joint at least one edge of an adjacent structural board.

14. A wall system comprising a plurality of the composite structural board of claim 7, wherein the plurality of composite structural boards forms a surface in the same plane, with at least one edge of one of the structural boards forming an abutment joint at least one edge of an adjacent structural board.

* * * * *